US009784554B2

(12) United States Patent
Gray

(10) Patent No.: US 9,784,554 B2
(45) Date of Patent: Oct. 10, 2017

(54) METHOD FOR MEASURING A ROTARY AXIS OF A MACHINE TOOL SYSTEM

(75) Inventor: Paul J. Gray, Zionsville, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 937 days.

(21) Appl. No.: 13/425,026

(22) Filed: Mar. 20, 2012

(65) Prior Publication Data

US 2013/0253871 A1    Sep. 26, 2013

(51) Int. Cl.
| | |
|---|---|
| *G06F 3/00* | (2006.01) |
| *B23Q 17/22* | (2006.01) |
| *G01B 21/24* | (2006.01) |
| *G01B 5/008* | (2006.01) |
| *G01B 5/25* | (2006.01) |

(52) U.S. Cl.
CPC .............. *G01B 5/25* (2013.01); *B23Q 17/22* (2013.01); *G01B 5/008* (2013.01); *G01B 21/24* (2013.01)

(58) Field of Classification Search
CPC ........ G05B 19/401; G05B 2219/37101; G05B 2219/49194; G05B 2219/50137; G05B 19/4015; G05B 19/409; G05B 2219/35257; G05B 2219/35259; G05B 2219/37043; G05B 2219/39032; G05B 2219/50152; G05B 2219/5035
See application file for complete search history.

(56) References Cited

U.S. PATENT DOCUMENTS

| | | | |
|---|---|---|---|
| 4,369,581 A | * | 1/1983 | Lenz ............................... 33/1 M |
| 5,329,457 A | | 7/1994 | Hemmerle et al. |
| 5,357,450 A | | 10/1994 | Hemmerle et al. |
| 6,493,956 B1 | * | 12/2002 | Matsuda ........................ 33/502 |
| 6,640,607 B2 | | 11/2003 | Abbe |

(Continued)

FOREIGN PATENT DOCUMENTS

| | | |
|---|---|---|
| GB | 2 060 888 A | 5/1981 |
| GB | 2060888 A | 5/1981 |

(Continued)

OTHER PUBLICATIONS

Christopher, Algorithms for Finding the Axis of a Helix, 1996, Computer Chem, vol. 20, No. 3, pp. 339-345.*

(Continued)

*Primary Examiner* — Janet Suglo
*Assistant Examiner* — Lisa Peters
(74) *Attorney, Agent, or Firm* — Faegre Baker Daniels LLP

(57) ABSTRACT

The present disclosure includes a method for use on a machine tool system having a controller, three linear axes of motion and at least one rotary axis, for determining the orientation of the rotary axis relative to the linear axes, including mounting a sphere to a system component that rotates about the rotary axis, rotating the component to move the sphere to at least three positions about the rotary axis, measuring a center of the sphere at each of the positions by using the controller to move a probe mounted to a spindle of the system into contact with the sphere, computing, using the controller, a plane fitting the center measurements, and computing, using the controller, a vector normal to the plane passing through a center of rotation of an arc lying in the plane and fitting the center measurements, the vector corresponding to the orientation of the rotary axis.

22 Claims, 17 Drawing Sheets

(56) References Cited

U.S. PATENT DOCUMENTS

| | | |
|---|---|---|
| 6,748,790 B2 | 6/2004 | Abbe |
| 6,810,600 B1 | 11/2004 | Horwarth et al. |
| 6,865,498 B2 | 3/2005 | Hardesty |
| 7,278,222 B2 * | 10/2007 | Maier et al. ............... 33/502 |
| 8,798,790 B2 * | 8/2014 | Kamiya et al. ............ 700/245 |
| 2002/0189319 A1 * | 12/2002 | Abbe ............... G01B 21/042 73/1.01 |
| 2004/0244464 A1 * | 12/2004 | Hajdukiewicz ...... G01B 21/042 73/1.79 |
| 2008/0058982 A1 * | 3/2008 | Gray ........................... 700/159 |
| 2008/0111985 A1 * | 5/2008 | Bridges ..................... 356/3.16 |
| 2008/0161965 A1 | 7/2008 | Haines et al. |
| 2008/0188986 A1 * | 8/2008 | Hoppe ................. B25J 9/1692 700/263 |
| 2009/0183610 A1 * | 7/2009 | Maxted et al. ............. 82/1.11 |
| 2010/0101104 A1 * | 4/2010 | Grzesiak et al. ............ 33/502 |
| 2010/0281705 A1 * | 11/2010 | Verdi et al. ................. 33/503 |
| 2011/0000277 A1 * | 1/2011 | MacManus ......... G01B 21/042 73/1.79 |

FOREIGN PATENT DOCUMENTS

| | | |
|---|---|---|
| WO | WO 03/064118 A1 | 8/2003 |
| WO | WO 03064118 A1 | 8/2003 |

OTHER PUBLICATIONS

Betz, Solid Geometery, "1916", The Athenxum Press, Book VIII, p. 442.*

Fitzpatrick, Euclid's Elements of Geometry, 1883, Book 3, p. 70.*

International Preliminary Report on Patentability issued by The International Bureau of WIPO, Geneva, Switzerland, dated Sep. 23, 2014 for International Application No. PCT/US2013/033092; 6 pages.

International Searching Authority, International Search Report for PCT/US2013/033092, dated Jun. 26, 2013.

Reinshaw, Calibrating 5-axis machines to improve part accuracy, 5Align™, dated Sep. 2008, 33 pages.

Heidenhain, "User's Manual Touch Probe Cycles iTNC 530", dated Nov. 2007, 191 pages.

Siemens, "User Guide My Sinumerik Operate", dated 2011, 142 pages.

Kinematics opt video available at http://www.youtube.com/watch?v=0cxRSFOzEck labeled, Machine 5 axes kinematics opt option Heidenhain pour configurer la cinematique d'une machine showing Heidenhain instrument with angle tracking option, dated as uploaded Nov. 2010.

Kinematik Check mit 5X Kinematik Set von Präzisionstechnik24 Cycle996 bzw Kinematicsopt video available at http://www.youtube.com/watch?NR=1&v=M-Q4aTGn-gM labeled "Weitere Details und Messzubehör zum Kinematik vermessen finden unter www.kinematik-check.de", showing Heidenhain without angle tracking option, dated as uploaded Nov. 2009.

Kinematics measuring cycle CYCLE996 video available at http://www.youtube.com/watch?v=gkm1h1EBYvo&feature=related labeled "The new kinematics measuring cycle CYCLE996 of the Sinumerik 840D enables the measurement of the axis kinematics of machine tools with several rotary axes, without the previous large expenditure of time and costs." dated as uploaded Nov. 2008.

* cited by examiner

METHOD FOR MEASURING A ROTARY AXIS OF A MACHINE TOOL SYSTEM

FIELD OF THE INVENTION

The invention relates to machine tool control software. More specifically, the field of the invention is that of machine tool control software that facilitates controlling a probe to measure the center point of a sphere at various positions about a rotary axis to determine the location and orientation (hereinafter collectively, "the orientation") of the rotary axis relative to the linear axes of the system.

BACKGROUND AND SUMMARY OF THE INVENTION

Machine tool systems generally include a controller that executes instructions interpreted by the machine tool control software to generate commands for controlling the operation of the machine tool system, including the position of a tool that shapes or cuts a part. Many such machine tool systems include components that move along three linear axes, as well as components that move about one or more rotary axes. To accurately form parts using such a machine tool system, it is necessary for the controller to know the precise orientation of the rotary axes relative to the machine coordinate system.

In one exemplary embodiment of the present disclosure, a method is provided for use with a machine tool system having a controller, three linear axes of motion establishing the machine coordinate system and at least one rotary axis, for determining the orientation of the rotary axis relative to the linear axes. The method includes the steps of mounting a sphere to a component of the system, mounting a probe to a spindle of the system, rotating one of the sphere and the probe to at least three positions about the rotary axis, measuring a center of the sphere at each of the positions by using the controller to move the probe into contact with the sphere, computing, using the controller, a plane that fits the center measurements, and computing, using the controller, a vector normal to the plane that passes through a center of rotation of an arc that lies in the plane and fits the center measurements, the vector corresponding to the orientation of the rotary axis.

In a variant of the exemplary embodiment, the method further includes the step of calibrating the probe to the sphere by manually locating the center of the sphere using a test indicator, and using the controller to move the probe toward the center of the sphere from a plurality of directions to determine deflection offsets of the probe resulting from contact with the sphere in each of the plurality of directions.

In another variant of the exemplary embodiment, the measuring step includes contacting the sphere with the probe from various directions, using the controller to calculate a center point of the sphere from location data corresponding to points of contact between the probe and the sphere, repeating the contacting and calculating steps, comparing a difference between the calculated center points to a predefined tolerance threshold, and repeating the contacting, calculating and comparing steps until the difference is within the tolerance threshold.

The measuring steps of the exemplary embodiment include using the controller to direct the probe toward the sphere in a positive direction along an X-axis of a coordinate system of the probe until the probe contacts the sphere at a first contact point, direct the probe toward the sphere in a negative direction along the X-axis until the probe contacts the sphere at a second contact point, compute a first midpoint between the first and second contact points, direct the probe toward the sphere in a positive direction along a first path that is parallel to a Y-axis of the probe coordinate system and passes through the first midpoint until the probe contacts the sphere at a third contact point, direct the probe toward the sphere in a negative direction along the first path until the probe contacts the sphere at a fourth contact point, compute a second midpoint between the third and fourth contact points, direct the probe toward the sphere along a second path that is parallel to a Z-axis of the probe coordinate system and passes through the first and second midpoints until the probe contacts the sphere at a fifth contact point, and compute a first center point of the sphere relative to the machine coordinate system from location data corresponding to each of the contact points.

A variant of the measuring steps of the exemplary embodiments further includes using the controller to direct the probe toward the sphere in a positive direction along a third path that is parallel to the X-axis of the probe coordinate system and passes through the second midpoint until the probe contacts the sphere at a sixth contact point, direct the probe toward the sphere in a negative direction along the third path until the probe contacts the sphere at a seventh contact point, compute a third midpoint between the sixth and seventh contact points, direct the probe toward the sphere in a positive direction along a fourth path that is parallel to the Y-axis of the probe coordinate system and passes through the third midpoint until the probe contacts the sphere at an eighth contact point, direct the probe toward the sphere in a negative direction along the fourth path until the probe contacts the sphere at a ninth contact point, compute a fourth midpoint between the eighth and ninth contact points, direct the probe toward the sphere along a fifth path that is parallel to the Z-axis of the probe coordinate system and passes through the third and fourth midpoints until the probe contacts the sphere at a tenth contact point, compute a second center point of the sphere relative to the machine coordinate system from location data corresponding to each of the fifth through tenth contact points, compute a difference between the first center point to the second center point, and compare the difference to a predefined tolerance.

Another variant of the measuring steps of the exemplary embodiments further includes using the controller to compute measured radii of the sphere using the location data corresponding to each of the contact points, compare the measured radii to a known radius of the sphere, and identify the first center point as the center of the sphere if the measured radii fall within a predetermined tolerance of the known radius.

In another variant of the exemplary embodiments, the rotating step includes automatically moving the probe along with the sphere as the sphere is moved to different positions about the rotary axis. This variant may further include maintaining the probe at a constant radius from the center of the sphere as the sphere or probe is moved to the different positions.

In a further exemplary embodiment of the present disclosure, a method is provided for use on a machine tool system having a controller, three linear axes of motion establishing a machine coordinate system and a rotary axis, for determining a shift of the rotary axis. The method includes the steps of mounting a sphere to a component of the system that is rotatable about the rotary axis at a first location at a first distance from the rotary axis, rotating the component to move the sphere in the first location to a first set of at least three positions about the rotary axis, measuring a first set of center points of the sphere, one center point for each of the first set of at least three positions, by using the controller to move a probe mounted to a spindle of the system into contact with the sphere, computing, using the controller, a first plane that fits the first set of center points, mounting the sphere to the component at a second location at a second distance from the rotary axis, the second distance being different from the first distance, rotating the component to move the sphere in the second location to a second set of at least three positions about the rotary axis, measuring a second set of center points of the sphere, one center point for each of the second set of at least three positions, by using the controller to move the probe into contact with the sphere, computing, using the controller, a second plane that fits the second set of center points, and comparing, using the controller, the first and second planes to determine a shift of the rotary axis.

In yet a further exemplary embodiment of the present disclosure, a method is provided for use on a machine tool system having a controller, three linear axes of motion establishing a machine coordinate system and a rotary axis, for determining a shift of the rotary axis. The method includes the steps of mounting a probe to a first component of the system that is rotatable about the rotary axis at a first location such that a tip of the probe is at a first distance from the rotary axis, mounting a sphere to a second component of the system, rotating the first component to move the probe in the first location to a first set of at least three positions about the rotary axis, measuring a first set of center points of the sphere, one center point for each of the first set of at least three positions, by using the controller to move the probe into contact with the sphere, computing, using the controller, a first plane that fits the first set of center points, mounting the probe to the first component at a second location such that the tip of the probe is at a second distance from the rotary axis, the second distance being different from the first distance, rotating the first component to move the probe in the second location to a second set of at least three positions about the rotary axis, measuring a second set of center points of the sphere, one center point for each of the second set of at least three positions, by using the controller to move the probe into contact with the sphere, computing, using the controller, a second plane that fits the second set of center points, and comparing, using the controller, the first and second planes to determine a shift of the rotary axis.

In yet a further exemplary embodiment of the present disclosure, a method is provided for measuring a rotary axis of a machine tool system relative to an X-axis, a Y-axis and a Z-axis of the system. The method includes the steps of mounting a sphere to a component of the system that is movable about the rotary axis, positioning the sphere in a first position at a first angle relative to the rotary axis, mounting a probe to a spindle of the system, determining a first center point of the sphere in the first position by using a controller of the system to perform a sphere center measurement operation, positioning the sphere in a second position at a second angle relative to the rotary axis, determining a second center point of the sphere in the second position by using the controller to perform the sphere center measurement operation, positioning the sphere in a third position at a third angle relative to the rotary axis, determining a third center point of the sphere in the third position by using the controller to perform the sphere center measurement operation, computing a plane that fits the first, second and third center points, computing an arc that lies in the plane and fits the X and Y coordinates of the first, second and third center points, computing a center of rotation of the arc, and identifying the orientation of the rotary axis as a vector normal to the plane that passes through the center of rotation.

In one exemplary embodiment, The sphere center measurement operation includes the steps of directing the probe toward the sphere in a positive direction along an X-axis of a coordinate system of the probe until the probe contacts the sphere at a first contact point, directing the probe toward the sphere in a negative direction along the X-axis until the probe contacts the sphere at a second contact point, computing a first midpoint between the first and second contact points, directing the probe toward the sphere in a positive direction along a path parallel to a Y-axis of a coordinate system of the probe that passes through the first midpoint until the probe contacts the sphere at a third contact point, directing the probe toward the sphere in a negative direction along the path parallel to the Y-axis until the probe contacts the sphere at a fourth contact point, computing a second midpoint between the third and fourth contact points, directing the probe toward the sphere along a path parallel to a Z-axis of a coordinate system of the probe that passes through the first and second midpoints until the probe contacts the sphere at a fifth contact point, and computing the first center point of the sphere within a three dimensional volume of the system using the first, second, third, fourth and fifth contact points, the center point having an X coordinate, a Y coordinate, and a Z coordinate.

A variant of the sphere center measurement operation of this exemplary embodiment further includes the steps of directing the probe toward the sphere in a positive direction along a third path that is parallel to the X-axis and passes through the second midpoint until the probe contacts the sphere at a sixth contact point, directing the probe toward the sphere in a negative direction along the third path until the probe contacts the sphere at a seventh contact point, computing a third midpoint between the sixth and seventh contact points, directing the probe toward the sphere in a positive direction along a fourth path that is parallel to the Y-axis of the probe coordinate system and passes through the third midpoint until the probe contacts the sphere at an eighth contact point, directing the probe toward the sphere in a negative direction along the fourth path until the probe contacts the sphere at a ninth contact point, computing a fourth midpoint between the eighth and ninth contact points, directing the probe toward the sphere along a fifth path that is parallel to the Z-axis of the probe coordinate system and passes through the third and fourth midpoints until the probe contacts the sphere at a tenth contact point, computing a second center point of the sphere relative to the linear axes from location data corresponding to each of the fifth through tenth contact points, computing a difference between the first center point to the second center point, and comparing the difference to a predefined tolerance.

In yet a further exemplary embodiment of the present disclosure, a method is provided for measuring a rotary axis of a machine tool system relative to X, Y and Z axes of the system using a probe mounted to a spindle of the system, including mounting a sphere to a component of the system, positioning the probe in a first position about the rotary axis, determining a first center point of the sphere by using a controller of the system to perform a sphere center measurement operation, positioning the probe in a second position about the rotary axis, determining a second center point of the sphere by using the controller to perform the sphere center measurement operation, positioning the probe in a third position about the rotary axis, determining a third center point of the sphere by using the controller to perform the sphere center measurement operation, computing a plane that fits the center points, computing an arc that lies in the plane and fits the X and Y coordinates of the center points, computing a center of rotation of the arc, and identifying the orientation of the rotary axis as a vector normal to the plane that passes through the center of rotation. The sphere center measurement operation includes the steps of moving the probe in a positive direction along an X-axis of a coordinate system of the probe into contact with the sphere at a first contact point, moving the probe in a negative direction along the X-axis of the probe coordinate system into contact with the sphere at a second contact point, moving the probe in a positive direction along a first path parallel to a Y-axis of a coordinate system of the probe into contact with the sphere at a third contact point, the first path passing through a first midpoint between the first and second contact points, moving the probe in a negative direction along the first path into contact with the sphere at a fourth contact point, moving the probe along a second path parallel to a Z-axis of a coordinate system of the probe into contact with the sphere at a fifth contact point, the second path passing through the first midpoint and a midpoint between the third and fourth contact points, and computing the first center point of the sphere using X, Y and Z coordinates corresponding to each of the contact points, the center point having X, Y and Z coordinates.

In still a further exemplary embodiment of the present disclosure, a method is provided for measuring a rotary axis of a machine tool system relative to X, Y and Z axes establishing a machine coordinate system using a probe mounted to a spindle of the system, including positioning a sphere in a first position about the rotary axis, determining a center point of the sphere in the first position by using a controller of the system to perform a sphere center measurement operation including moving the probe into contact with the sphere at five contact points corresponding to contact in a positive and a negative X direction, a positive and a negative Y direction, and a Z direction of a coordinate system of the probe, and computing a center of the sphere using coordinates of the contact points, rotating the sphere about the rotary axis into a second position, determining a center point of the sphere in the second position by using the controller to perform the sphere center measurement operation, rotating the sphere about the rotary axis into a third position, determining a center point of the sphere in the third position by using the controller to perform the sphere center measurement operation, calculating a centroid using the center points, transforming the center points such that the centroid is an origin of the center points, computing a plane that fits the transformed center points, projecting the transformed center points onto the plane, computing an arc that fits the projected center points, determining a center point of the arc, transforming coordinates of the arc center point into the machine coordinate system, and identifying the orientation of the rotary axis as a vector normal to a plane that passes through the transformed coordinates of the arc center point.

BRIEF DESCRIPTION OF THE DRAWINGS

The above mentioned and other features and objects of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
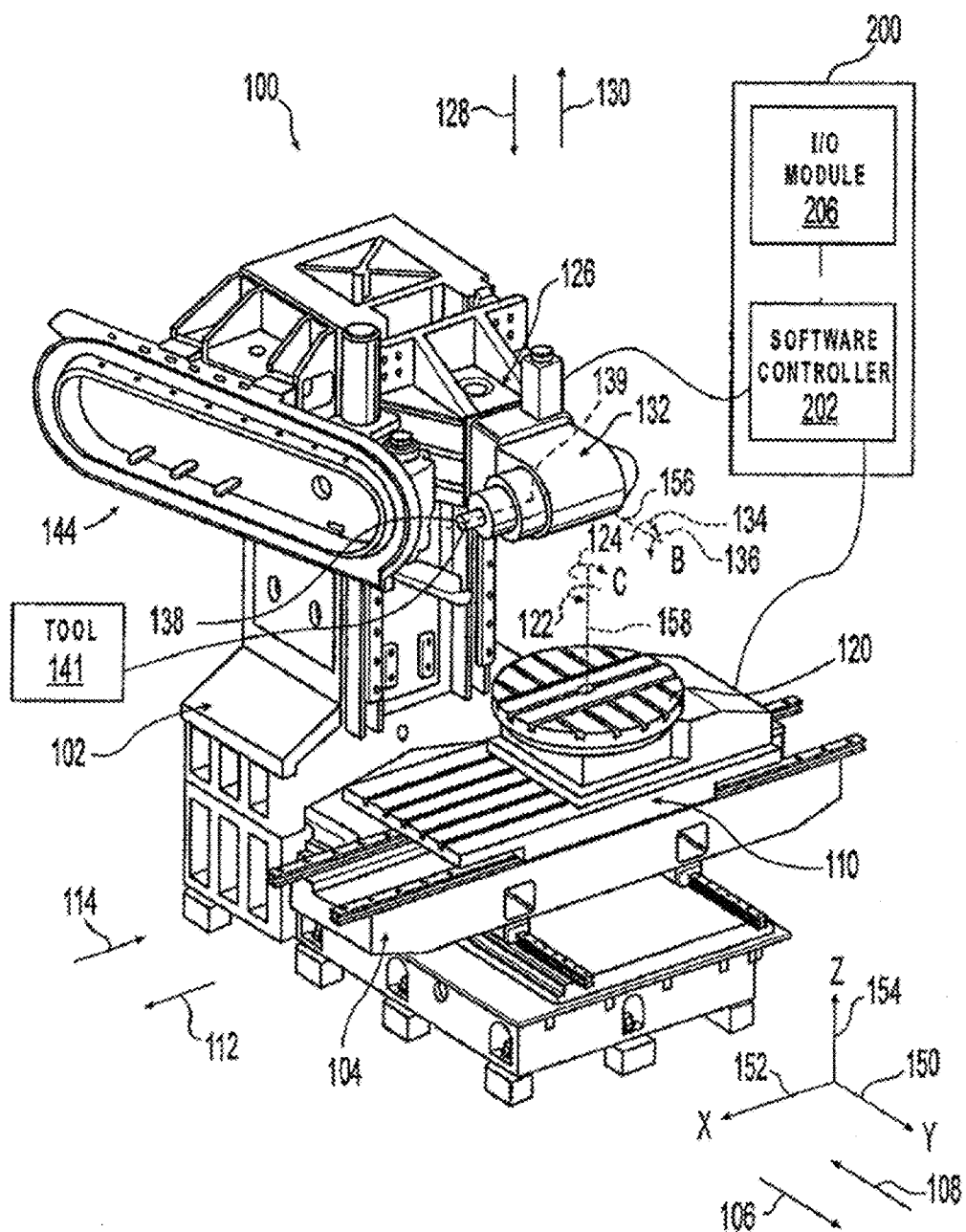
FIG. 1 illustrates an exemplary machine tool system.

Referring to FIG. 1, a machine tool system 100 is shown having a motion control system 200. Machine tool system 100 includes a frame 102 having a first saddle 104 coupled thereto. Saddle 104 is translatable in directions 106 and 108. A second saddle 110 is supported by first saddle 104. Saddle 110 is translatable in directions 112 and 114 relative to saddle 104. A platform 120 is supported by saddle 110 and is rotatable relative to saddle 110 in directions 122 and 124. In one embodiment, each of saddle 104, saddle 110, and platform 120 are moveable by a drive system including a plurality of motors which are controlled by controller 202 of motion control system 200.

Further, a third saddle 126 is supported by frame 102. Saddle 126 is translatable in directions 128 and 130. Saddle 126 supports a rotatable member 132. Rotatable member 132 is rotatable in directions 134 and 136 relative to saddle 126. In one embodiment, each of saddle 126 and rotatable member 132 are moveable through motors which are controlled by controller 202 of motion control system 200.

A tool spindle 138 is supported by rotatable member 132. Various tools 141 may be coupled to tool spindle 138 to perform various operations with machine tool system 100. Tool spindle 138 is rotatable about a tool spindle axis 139 to input a rotation to the tool 141.

Figure 3:
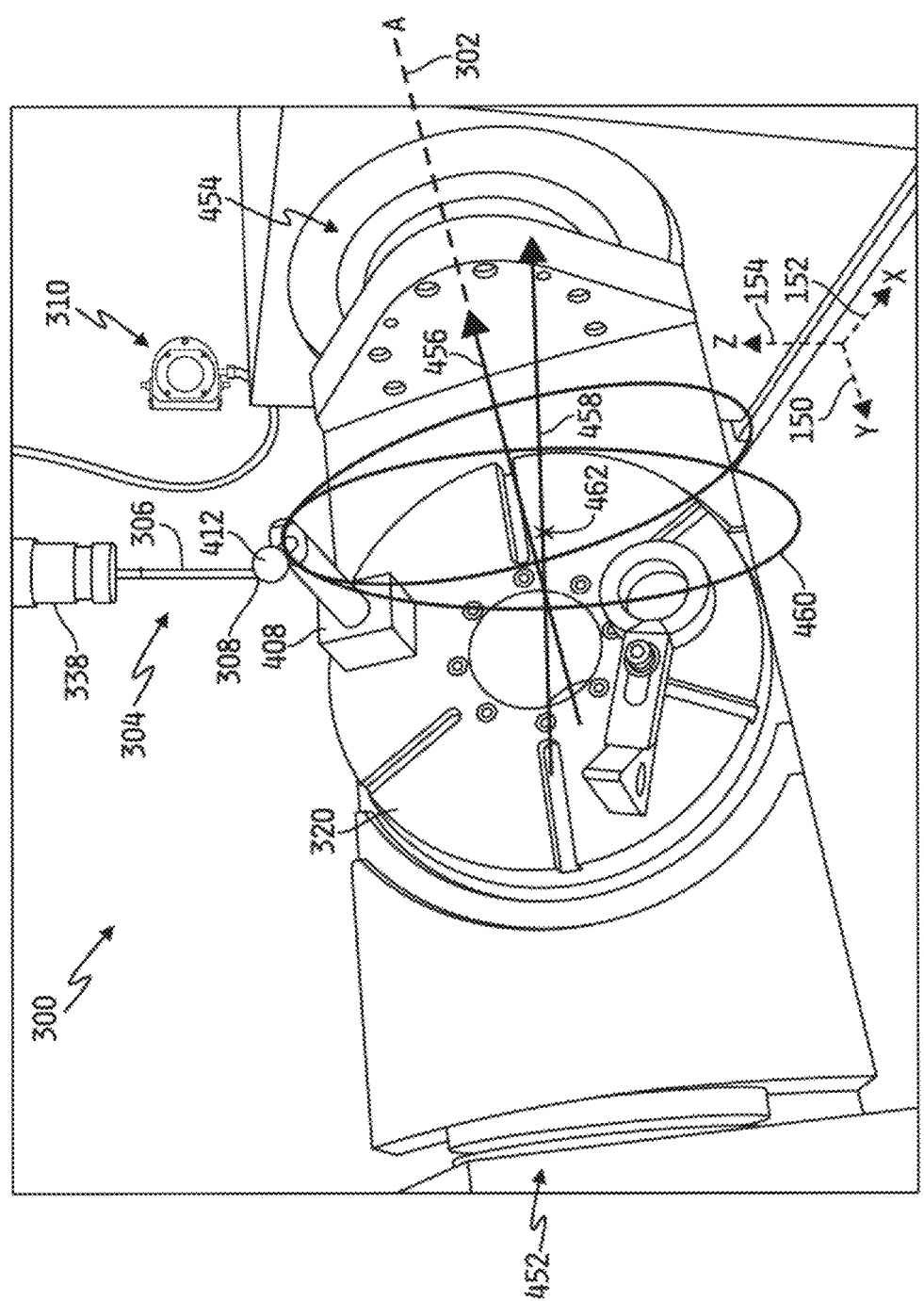
FIG. 3 is a perspective view of another exemplary machine tool system.

The movement of saddle 104 in direction 106 or direction 108 is illustrated as a movement along a Y-axis 150. The movement of saddle 110 in direction 112 or direction 114 is illustrated as a movement along an X-axis 152. The movement of saddle 126 in direction 128 and direction 130 is illustrated as a movement along a Z-axis 154. The rotation of rotatable member 132 in direction 134 or direction 136 is illustrated as a movement about a B-axis 156. The rotation of platform 120 in direction 122 or direction 124 is illustrated as a movement about a C-axis 158. Machine tool system 100 is an exemplary 5-axis machine. Machine tool system 300 of FIG. 3 is an example of another 5-axis machine wherein C-axis 158 is replaced with an A-axis 302, and platform 320 is tiltable or rotatable about A-axis 302.

The movement of one or more of the 5-axes of machine tool system 100 is controlled through motion control system 200. In addition to executing algorithms corresponding to the methods described herein, system 200 may execute the algorithms described in U.S. patent application Ser. No. 11/833,971, filed Aug. 3, 2007, titled "GENERALIZED KINEMATICS SYSTEM," the disclosure of which is expressly incorporated by reference herein.

Figure 2:
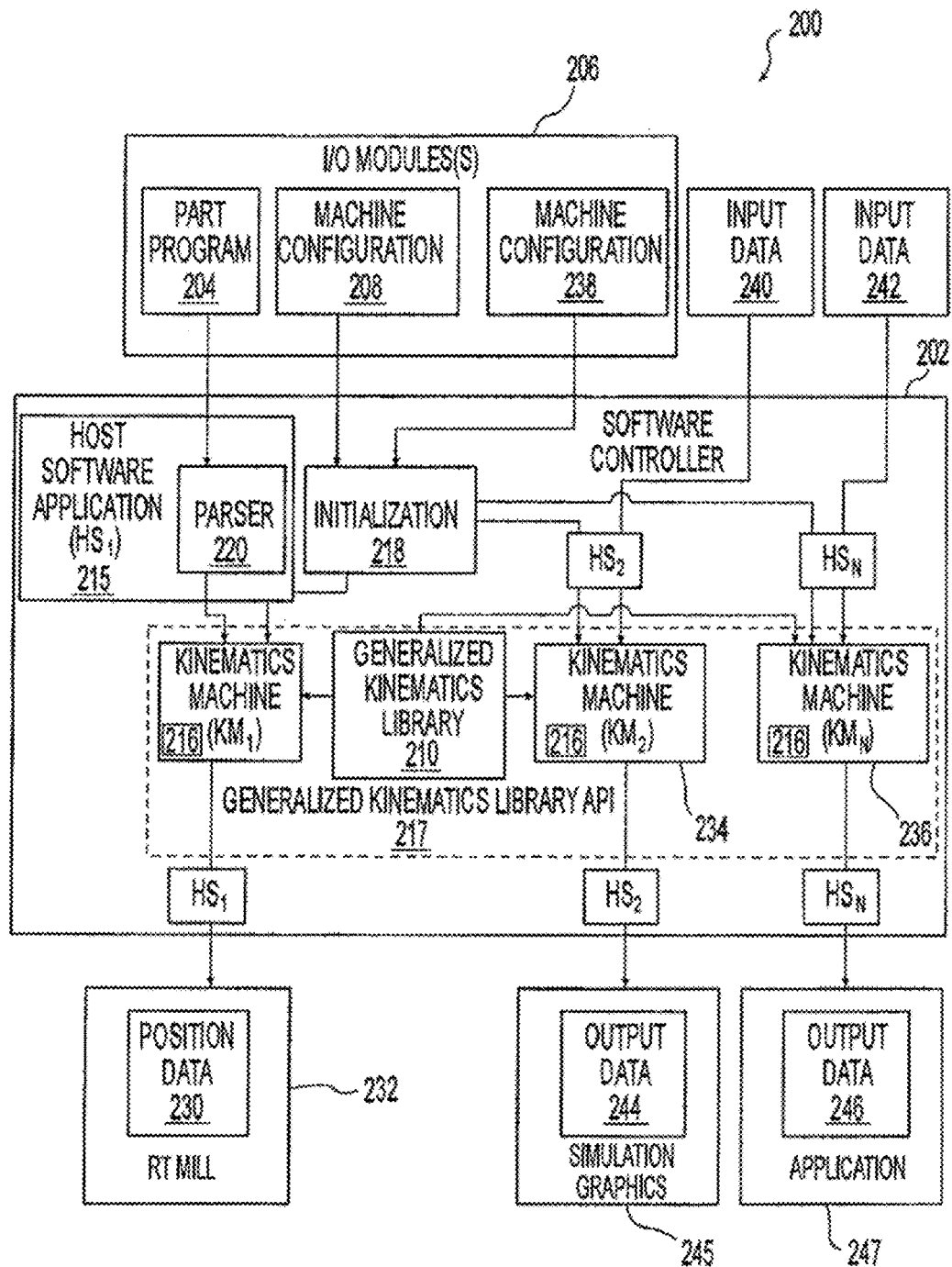
FIG. 2 is a block diagram of a motion control system of the exemplary machine tool system of FIG. 1.

Referring to FIG. 2, motion control system 200 includes a software controller 202 and one or more I/O modules 206. It should be understood that the methods disclosed herein may be executed by software controller 202 and be stored in a manner associated with software controller 202. Software controller 202 receives a machine configuration 208 and input data, such as a part program 204, and then provides output data, such as position data for the various axes 150, 152, 154, 156, and 158 of machine tool system 100. In the illustrated example in FIG. 2, software controller 202 receives part program 204 and machine configuration 208 from one or more I/O modules 206. Machine configuration 208 provides the dependencies between the various axes 150, 152, 154, 156, and 158 of machine tool system 100 as well as the attributes of each axis. For instance, as saddle 104 moves in direction 106, the location of C-axis 158 is changed. Therefore, the orientation of C-axis 158 depends on the location of saddle 104.

Exemplary I/O modules 206 include input members, such as a user interface, a touch display, a keyboard, a mouse, one or more buttons or switches, a CD drive, a floppy drive, an interface to a determiner network (wireless or wired), and other suitable devices for providing information to software controller 202 and output members, such as a display (such as a touch screen), lights, printer, and other suitable devices for presenting information.

In one embodiment, part program 204 is entered through a conversational mode of operation whereby a user during a programming session is presented with one or more screens through a user interface (such as a touch screen and keyboard). An exemplary method of conversational programming is disclosed in U.S. Pat. No. 5,453,933, assigned to the assignee of the current application, the disclosure of which is expressly incorporated by reference herein. During the programming session, the user may program the desired geometry for the machined part and specify one or more attributes. In one example, the user specifies the desired geometry for the machined part by creating blocks of code, each of which specifies a tool and other machining parameters. Software controller 202 then generates the tool trajectories for cutting the tool to the desired geometry.

Regardless of the origin of part program 204, part program 204 defines the desired geometry for the machined part either directly or based on the operations used to create the part. However, part program 204 may not specify the positions of saddles 104, 110, and 126 nor the rotations of platform 120 and rotatable member 132. These positions are determined by software controller 202. In one embodiment, software controller 202 is an object-oriented software component, based on the software described in U.S. Pat. No. 5,453,933 issued on Sep. 26, 1995 and titled CNC CONTROL SYSTEM, the disclosure of which is expressly incorporated by reference herein.

As should be apparent from the foregoing, precision machining can only be obtained using system 100, system 300 or any other multi-axis machine if machine configuration 208 accurately reflects the actual relationships between the various axes of the machine. Accordingly, it is necessary to measure, among other things, the orientation of the rotary axes relative to X-axis 152, Y-axis 150, and Z-axis 154 ("the machine coordinate system"). The center line of each rotary axis must be measured when system 100 is initially installed, and may require further measurement if, for example, mechanical damage results from tool 141 making unintended contact with a part or other component of system 100. Additionally, the geometries of system 100 may change over time as a result of, for example, extensive or heavy use of system 100.

As the methods of the present disclosure include probing surfaces, an initial step includes installing a measuring probe of a type known in the art and calibrating its response characteristics. Referring to FIG. 3, a conventional probe 304 is installed in spindle 338. Probe 304 includes a stylus 306 having a spherical tip 308, and can be of any of a variety of suitable types of probes. As is known in the art, when tip 308 contacts a surface, stylus 306 deflects or shifts at an angle relative to the surface. Both the contact event and the amount of deflection are detected by an appropriately mounted optical receiver 310 which is in communication with software controller 202 of motion control system 200. Accordingly, when stylus 306 contacts a surface, probe 304 detects the contact, sends a trigger signal to optical receiver 310 which signals a trigger in controller 202, and controller 202 stops movement of the machine axes (and therefore, stylus 306). When controller 202 receives the trigger signal in this manner, it stores the coordinates of the position of the point of contact that caused the trigger relative to X-axis 152, Y-axis 150, and Z-axis of the machine coordinate system.

Figure 4:
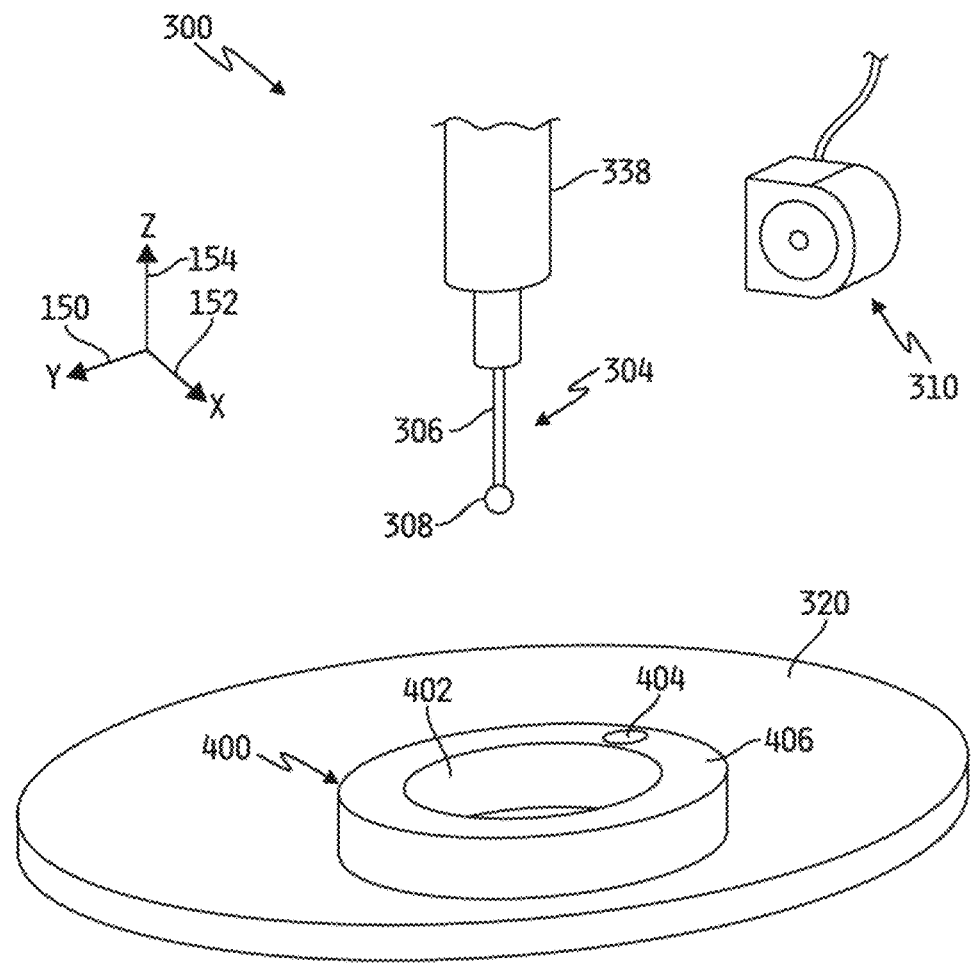
FIG. 4 is a perspective view of a calibration ring mounted to a platform of the machine tool system of FIG. 3.

Probe 304 must be calibrated to permit system 200 to compensate for the probe's response characteristics when probing surfaces (i.e., the probe's deflection offsets). A conventional method for calibrating the deflection offsets of probe 304 includes the use of a calibration ring, as depicted in FIG. 4. As shown, ring 400 is mounted to platform 320, which is positioned in the XY plane of system 300. Ring 400 includes a precision interior surface 402, and a precision portion 404 on its upper surface 406. To calibrate probe 304, an operator positions probe 304 near the center of ring 400 and moves it radially outwardly toward precision surface 402. When probe 304 contacts precision surface 402, controller 202 determines the coordinates of the point of contact, thereby indicating the distance probe 304 traveled. For a ring 400 having a two-inch inner diameter, for example, the distance probe 304 should travel from the center of ring 400 to any point on precision surface 402 is exactly one inch (for purposes of this discussion we are ignoring the radius of probe tip 308). If probe 304 is moved along X-axis 152 from the center of ring 400 into contact with precision surface 402 and the total travel of probe 304 is greater than one inch by distance X, then the deflection offset for an angle 0 (corresponding to movement in the positive X direction) is distance X. The calibration process includes moving probe 304 from the center of ring 400 at various angles (e.g., 15 degrees, 30 degrees, 45 degrees, and so on) into contact with precision surface 402, and measuring the distance traveled for each angle. By comparing the measurements to the theoretical positions of precision surface 402, the process determines the deflection offsets for each angle of movement in the XY plane. The deflection offset along the Z-axis 154 is measured by bringing probe 304 into contact with precision portion 404, sensing the contact, and determining the distance required for probe 304 to trigger after initial contact.

An alternative to the above-described probe calibration according to the present disclosure eliminates the need for a calibration ring. While calibrating a probe to the precision surfaces of a calibration ring may provide adequate measurements of the probe's deflection offsets, if the mounting surface of the calibration ring (i.e., platform 320 in the example above) is slightly warped or not square to the linear axes of system 300, then precision surface 402 will be skewed. When ring 400 is tilted, probe 304 is essentially measuring a cylindrical surface at an angle, which is an oval rather than a perfect circle. This imperfect orientation will introduce errors in the defection offset measurements. According to one embodiment of the disclosure, probe 304 is calibrated to a spherical calibration device, which is also the same device used in the methods for measuring a rotary axis orientation described herein.

Figure 5:
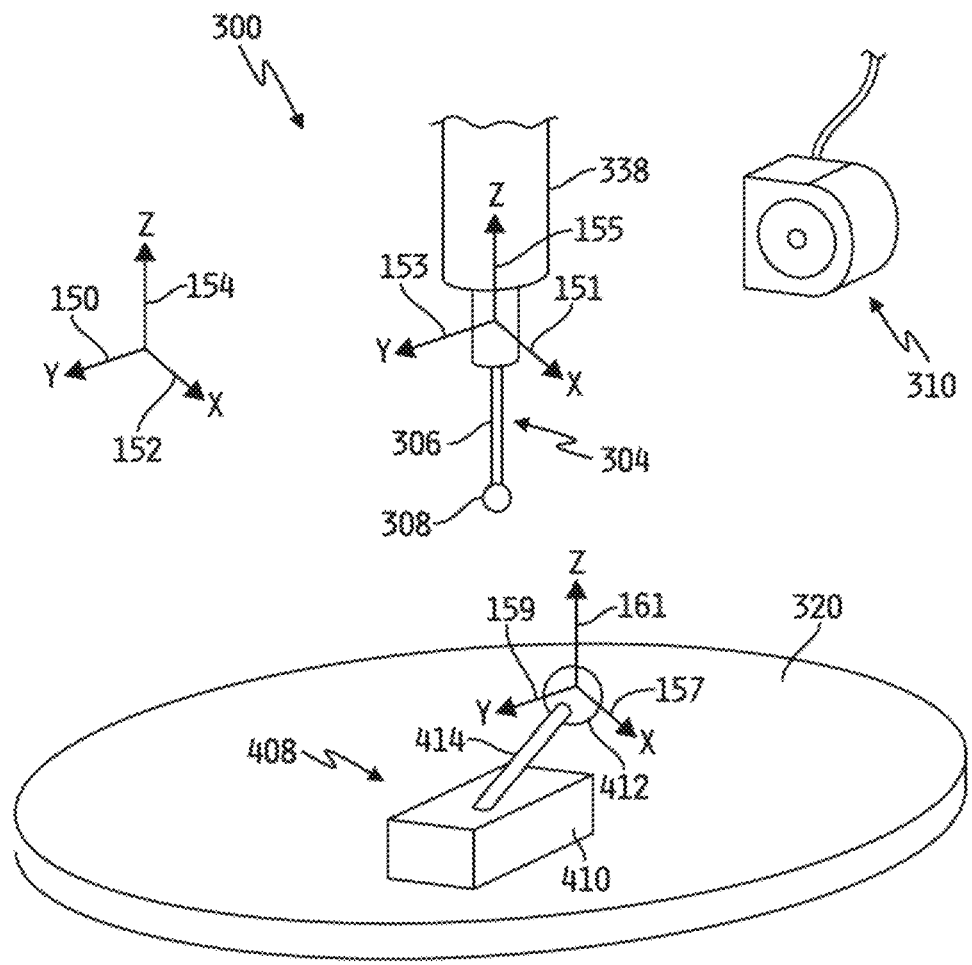
FIG. 5 is a perspective view of a calibration sphere mounted to a platform of the machine tool system of FIG. 3.

FIG. 5 depicts spherical calibration device 408 mounted to platform 320. As shown, spherical calibration device 408 includes a block 410, which is mounted to platform 320 using a magnetic base or any other conventional mounting technique, and a precision sphere 412 connected to block 410 by support arm 414. Sphere 412 provides a nearly perfectly spherical target surface, regardless of its orientation relative to platform 320. In other words, if platform 320 is warped or tilted, the probing surface of sphere 412 is still a perfect sphere located in space.

Figure 17A:
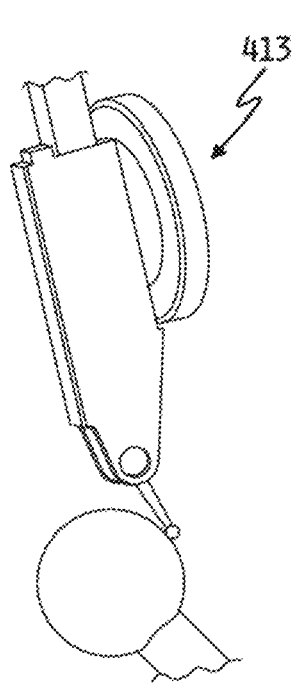
FIGS. 17A-C are perspective views of a test indicator mounted in a spindle and measuring a center location of a sphere.
Figure 17B:
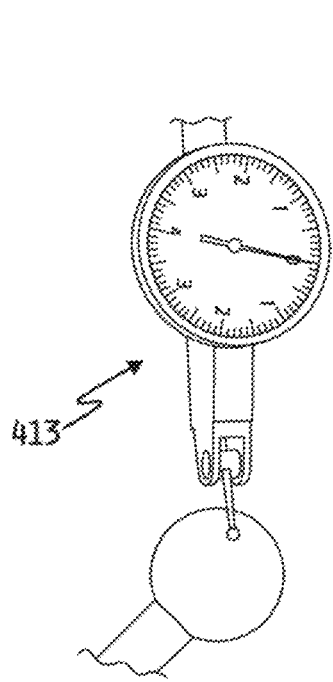
Figure 17C:
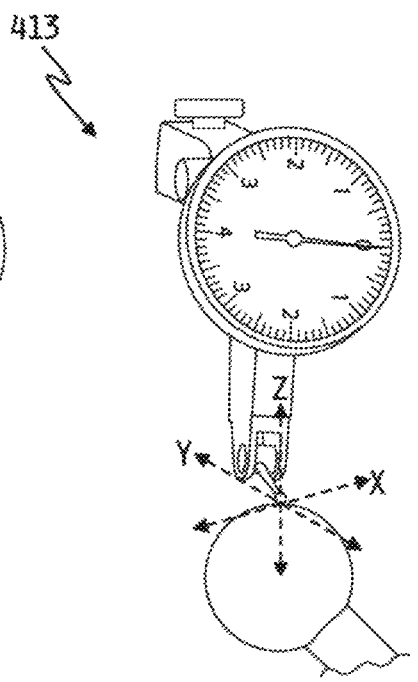

The first step of probe calibration using sphere 412 is to manually locate the center of sphere 412 with a test indicator 413 mounted in spindle 338 such as shown in FIGS. 17A-C. As is understood by those skilled in the art, manually measuring the center of sphere 412 is easier and faster than manually measuring the center of ring 400, primarily because it is easier to use a test indicator on a convex surface than on a concave surface.

After the center of sphere 412 is located relative to the linear axes of system 300, test indicator 413 in spindle 338 is replaced with probe 304 to be calibrated. As is described below, a component of the rotary axis measurement methods of the present disclosure includes using probe 304 to measure the center of sphere 412 at various positions relative to the rotary axis being measured. The process described below of using probe 304 to measure the center of sphere 412 involves contacting sphere 412 along the X-axis 152 in the positive and negative directions, along the Y-axis 150 in the positive and negative directions, and along the Z-axis 154 in the negative direction. As only these five measurements are needed to locate the center of sphere 412, the calibration process using the same sphere 412 need only include a calibration of deflection offsets of probe 304 in each of these five measurement directions.

During calibration, because the precise center of sphere 412 is known after the manual measurements using test indicator 413, when probe 304 is moved by controller 202 into contact with sphere 412 in any of the five measurement directions, it will contact sphere 412 at locations that are normal to the surface of sphere 412. As such, the deflection offsets measured using sphere 412 as the calibration device are precisely the deflection offsets that will be needed for the subsequent measurements of the center of sphere 412 when determining the orientation of a rotary axis. Additionally, using the above-described calibration technique, probe 304 is calibrated using a geometry (i.e., sphere 412) that is identical to the geometry the calibrated probe 304 will be used to measure, which may improve accuracy over calibrating to a ring.

Also referring to FIG. 5, in addition to the machine coordinate system (X-axis 152, Y-axis 150 and Z-axis 154), there is depicted a probe coordinate system including X-axis 151, Y-axis 153 and Z-axis 155, and a transform plane including X-axis 157, Y-axis 159 and Z-axis 161. The transform plane is set such that the coordinate origin is at the computed center of sphere 412 and X-axis 157, Y-axis 159 and Z-axis 161 align with X-axis 151, Y-axis 153 and Z-axis 155, respectively, of the probe coordinate system. The probe coordinate system is locked to probe 304 and is established when the probe deflection offsets are measured in the manner described above.

Figure 6:
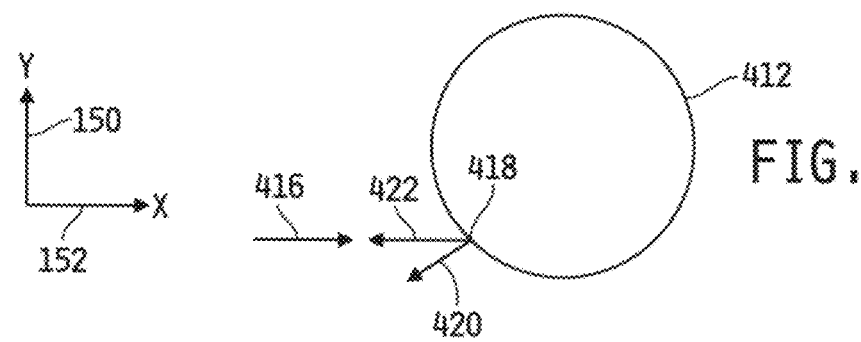
FIG. 6 is a conceptual diagram of deflection offsets associated with probing a calibration sphere.

As indicated above, regardless of the probe calibration method employed, the methods of the present disclosure further include the use of probe 304 to find the center of sphere 412 as part of a method for measuring a rotary axis. FIG. 6 depicts a view of sphere 412 of calibration device 408 along Z-axis 154, as indicated by the orientation of X-axis 152 and Y-axis 150. Vector 416 represents movement of probe 304 toward sphere 412 as part of a measurement operation of the center of sphere 412, as is further described below. The movement represented by vector 416 is accomplished by controller 202 moving probe 304 along X-axis 152 in the positive X direction. In this example, tip 308 of probe 304 contacts sphere 412 at location 418. As will almost always be the case when probing a sphere 412 in this context, probe 304 does not contact sphere 412 at a location that is perfectly normal to the surface of sphere 412. Accordingly, probe 304 deflects along vector 420 instead of vector 422. Controller 202, however, has no way of knowing that tip 308 deflected along vector 420. Controller 202 instead assumes that tip 308 deflected along vector 422, the deflection offset associated with angle 0 as determined in the calibration process described above, which is exactly along the X-axis 152 in a negative direction. This deflection offset is incorrect, and could lead to errors in determining the center of sphere 412. The method described below for determining the center of sphere 412, however, results in an accurate determination of the center of sphere 412 by converging to the correct sphere center location by comparing repetitive sphere measurements and thereby converging to the correct deflection offsets.

Figure 7A:
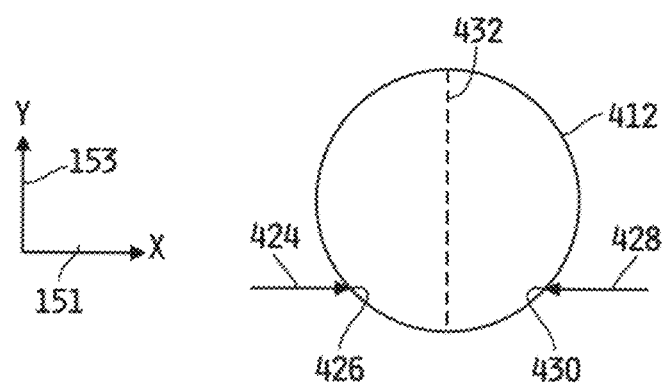
FIG. 7 is a conceptual diagram of a sphere center measurement operation according to an embodiment of the present disclosure.
Figure 7B:
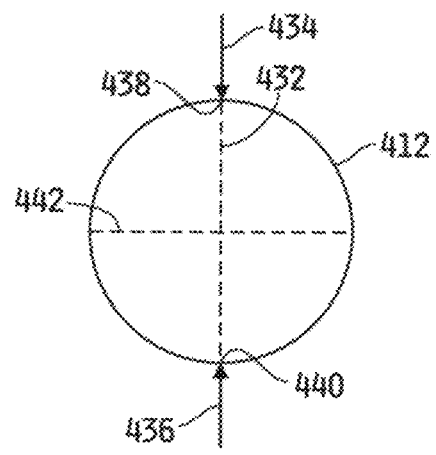
Figure 7C:
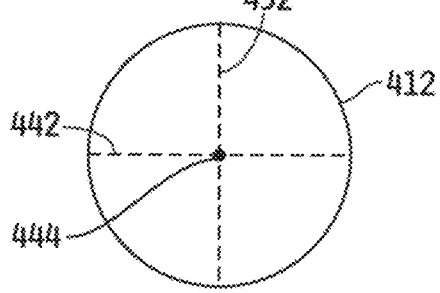

FIGS. 7A-C depict a method for dynamically locating the center of sphere 412 of calibration device 408 ("the sphere center measurement operation"), which is used in the rotary axis measurement operations described herein. The sphere center measurement operation, which is automatically performed by controller 202, includes five measurements using probe 304 as described herein, and essentially eliminates the errors associated with the use of incorrect deflection offsets. Again, the view in FIGS. 7A-C is along Z-axis 155 of the probe coordinate system. FIG. 7A represents measurements of sphere 412 along X-axis 151 of the probe coordinate system. More specifically, vector 424 represents a probe measurement of the sphere's position in the positive X direction. When probe 304 contacts sphere 412 at contact point 426, controller 202 stores location data representing the position of probe 304 in the three dimensional volume of system 300. Vector 428 represents a probe measurement of the sphere's position in the negative X direction. When probe 304 contacts sphere 412 at contact point 430, controller 202 again stores location data representing the position of probe 304 in the three dimensional volume of system 300. As shown, in this example probe 304 again does not contact sphere 412 at a location normal to its surface. Nonetheless, controller 202 will apply the deflection offsets determined for angle 0 (the positive X direction) and angle 180 (the negative X direction) obtained during the calibration process described above.

Figure 8:
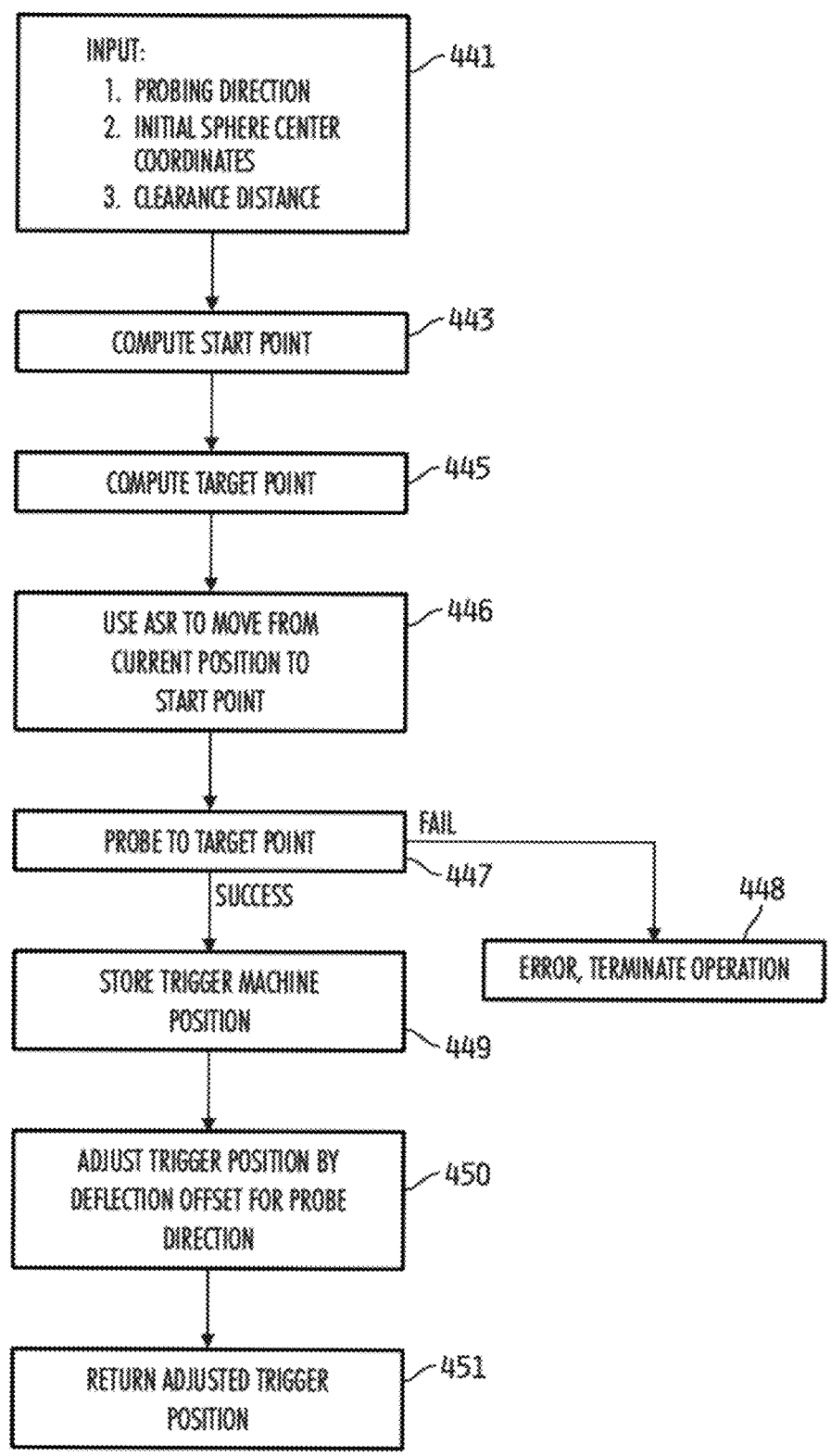
FIG. 8 is a block diagram of an operation for probing a point on a sphere according to an embodiment of the present disclosure.

Each step of probing sphere 412 described above with reference to FIG. 7A (and described below with reference to FIGS. 7B and 7C) may be performed by controller 202 in accordance with the sphere probing operation depicted in flowchart form in FIG. 8. As shown, the sphere probing operation begins with controller 202 receiving a plurality of inputs at block 441 including the probing direction (i.e., the positive or negative X direction, the positive or negative Y direction, or the Z direction), the initial sphere center coordinates measured using the test indicator 413 during calibration, and the clearance distance probe 304 must maintain from sphere 412. Next, controller 202 computes a start point at block 443 and a target point at block 445 for the point on sphere 412 to be probed. The start point is determined from the current estimate of the center location of sphere 412 and probing direction. At block 446 controller 202 repositions probe 304 from its current position to the probing start point according to the principles of automatic safe repositioning ("ASR") set forth in co-pending and co-owned U.S. patent application Ser. No. 12/575,847, filed on Oct. 8, 2009, titled "MACHINE TOOL SYSTEM CONTROL HAVING AUTOMATIC SAFE REPOSITIONING," ("the Safe Repositioning Application") the entire contents of which are hereby expressly incorporated herein by reference. Next, at block 447 controller 202 causes probe 304 to move from the start point to the target point in the probing direction at a slower, probing feedrate. During this movement, controller 202 monitors an input from optical receiver 310 to determine whether tip 308 makes contact with sphere 412. If no such trigger is detected, then controller 202 terminates operation and provides an error message as indicated by block 448. If a trigger is detected, then controller 202 stores the trigger position as indicated by block 449. Next, controller 202 adjusts the trigger position by the deflection offset corresponding to the probing direction (block 450) which was determined during the calibration operation described above. Finally, controller 202 returns the adjusted trigger position for use in later calculations as described below.

It should be noted that if stylus 306 of probe 304 were perfectly aligned in spindle 338 and perfectly symmetric in its deflection upon contacting an object from any direction, and if the trigger response of system 300 were immediate in each deflection direction, then use of deflection offsets would be unnecessary in carrying out the above-described measurements. In practice, however, stylus 306 will not be perfectly aligned and symmetric in its response. Additionally, there will be slight differences in the trigger response of probe 304 in each deflection direction. As a result of all of these imperfections in the system, the calibrated deflection offset for angle 0, for example, will likely be slightly different in magnitude from the calibrated deflection offset for angle 180. As such, the calibration deflection offsets are used in the sphere center measurement operation.

Referring now to FIG. 7B, controller 202 next probes sphere 412 in the positive Y direction (vector 434) and the negative Y direction (vector 436), stores the location data of probe 304 corresponding to contact points 438 and 440, and computes a midpoint between the two points in the manner described above. Although controller 202 uses the calibrated deflection offsets for the Y measurements, which will be slightly incorrect, the offsets used are not that important because, in this embodiment, controller 202 is only using the measurements of points 438, 440 to find a midpoint between them. The line 442 represents a new path for probing in the X direction, and the intersection of line 432 and line 442 provides a path for probing in the Z direction. FIG. 7C represents the step of probing sphere 412 in the Z direction. When probe 304 contacts sphere 412 in the Z direction, the calibrated Z direction offset is used and the location of the contact point in the three dimensional volume of system 300 is stored by controller 202. More specifically, the Z coordinate of the measured center of sphere 412 is computed using the location of the contact point in the Z direction relative to the sphere coordinate system, minus the length of probe 304, and minus the radius of sphere 412. Using all five of the measurements obtained above, controller 202 determines a center for sphere 412 (represented by point 444).

Figure 9:
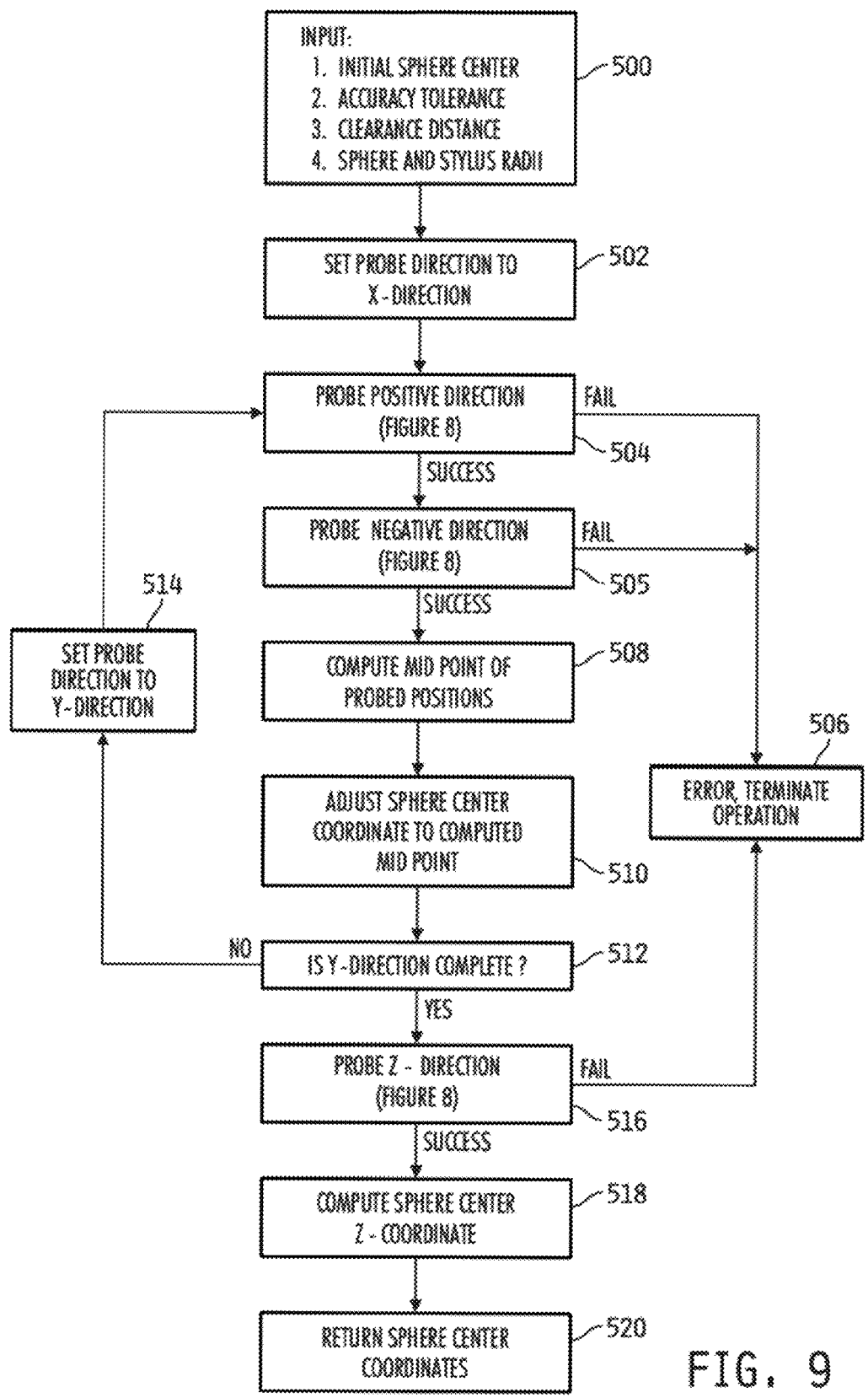
FIG. 9 is a block diagram of a sphere center measurement operation according to an embodiment of the present disclosure.

FIG. 9 provides a flowchart description of use of the above-described sphere center measurement operation to probe for the center location of sphere 412. At block 500, controller 202 receives inputs including the coordinates in the machine coordinate system of an initial center of sphere 412, a clearance distance that should be maintained between sphere 412 and tip 308 of probe 304, and the actual radius dimensions of sphere 412 and tip 308. At block 502, controller 202 sets the direction of movement of probe 304 to be along X-axis 151 of the probe coordinate system. At block 504, controller 202 moves probe 304 into contact with sphere 412 in the positive X direction and stores the coordinates of contact as described above with reference to FIG. 8. If controller 202 is unsuccessful in probing sphere 412 at block 504, then controller 202 returns an error to an operator of the system and terminates operation as indicated by block 506. If probing is successful in the positive X direction, then at block 505 controller 202 moves probe 304 into contact with sphere 412 in the negative X direction and stores the coordinates of contact as described above with reference to FIG. 8. If that measurement is unsuccessful, then controller 202 returns an error and terminates operation as indicated by block 506. If probing in both the positive and negative X directions is successful, then controller 202 computes a midpoint between the two measurements as described above (block 508). Next, at block 510 controller 202 adjusts the sphere center coordinate to the midpoint computed at block 508.

At block 512, controller 202 determines if probing of sphere 412 in the positive and negative directions along Y axis 153 is complete. If not, then controller 202 sets the probing direction to Y axis 153 of the probe coordinate system at block 514. The steps described above with reference to blocks 504-512 are then repeated for probing in the positive and negative Y directions. When block 512 is next reached, controller 202 determines that probing in the Y direction is complete. Accordingly, controller 202 next probes sphere 412 in the Z direction as described above and indicated by block 516. If the Z axis 155 probing is unsuccessful, then controller 202 terminates operation and provides an error message as indicated by block 506. If Z axis 155 probing is successful, then controller 202 computes the Z coordinate of the center of sphere 412 at block 518 in the manner described above. Finally, at block 520 controller 202 returns the X, Y and Z coordinates of the center of sphere 412, which is used in the rotary axis measurement operation described below.

It should be understood that the newly computed center of sphere 412, while likely very close to the true center of sphere 412, may be slightly off in one or more directions. The steps in FIGS. 7A-C represent the minimum number of probing operations (five) for locating the center of sphere 412 for use in the rotary axis measurement operations described below. To improve the accuracy of the computed center of sphere 412, controller 202 may repeat the sphere center measurement operation described above. Referring again to FIG. 7, in the next iteration of the sphere center measurement operation, controller 202 probes the sphere's position in the positive and negative X directions along the path depicted by line 442, which is parallel to X-axis 151 and much closer to intersecting the center of sphere 412 than the original orientations of vectors 424 and 428 (FIG. 7A). Accordingly, the calibrated deflection offsets corresponding to the positive and negative X directions will be very close to the actual deflections of probe 304 during this iteration. In other words, referring to FIG. 6, because probe 304 will contact sphere 412 at a location that is much closer to the normal surface of sphere 412, the actual deflection will be much closer to vector 422 (the calibrated deflection offset) than vector 420. Using these newly measured X direction contact points, controller 202 then determines a new X midpoint, and computes a new path through the midpoint for probing in the Y direction, which also will be closer to intersecting the center of sphere 412 than line 432. Finally, controller 202 probes sphere 412 in the Z direction along an axis that passes through an intersection of line 442 and the newly computed probing path in the Y direction. The resulting computed center of sphere 412 can be compared to the initially computed center to see if the difference between the two is within an acceptable tolerance. Alternatively, the sphere center measurement operation may be repeated one or more additional times until the computed center converges to a tolerance.

In one embodiment of the method, a limit is stored in system 200 specifying the maximum number of times the sphere center measurement operation can be performed for measuring the center of sphere 412 at any one location or position relative to the rotary axis. If the computations of the center of sphere 412 do not converge to a specified tolerance before the maximum number of iterations is reached, then controller 202 notifies the operator that the tolerance is too high or some other problem exists. In this manner, an endless loop of measurements is avoided.

Figure 10:
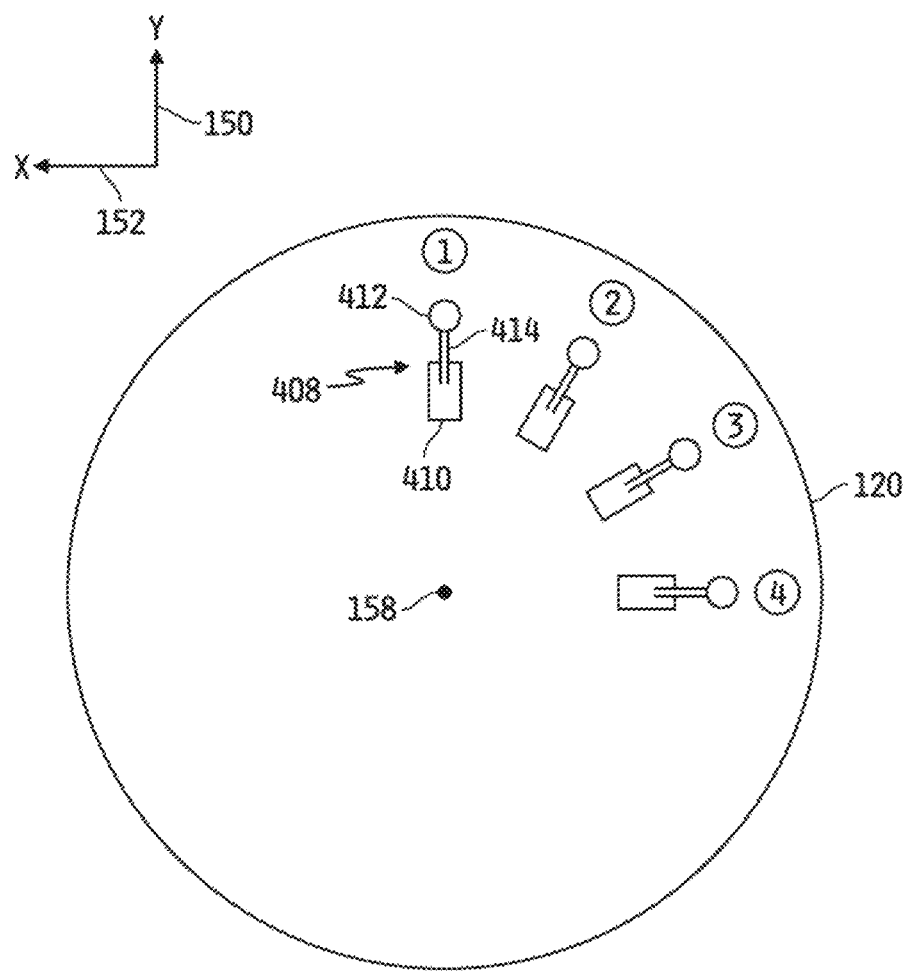
FIG. 10 is a conceptual diagram of a rotary axis measurement operation according to an embodiment of the present disclosure.

FIG. 10 depicts steps for measuring the orientation of rotary C-axis 158 of system 100 of FIG. 1 using the sphere center measurement operation described above ("the rotary axis measurement operation"). In FIG. 10, platform 120 is viewed from above (i.e., along Z-axis 154), as indicated by the orientation of X-axis 152 and Y-axis 150. Calibration device 408 is attached to platform 120 at a location radially offset from the center of rotation of platform 120, which in this instance is C-axis 158. Block 410 of calibration device 408 is mounted to platform 120 using a magnetic base or any other conventional mounting technique, and precision sphere 412 is supported by support arm 414 extending from block 210. As indicated above, sphere 412 provides a nearly perfectly spherical target surface for probe 304 mounted to spindle 138.

FIG. 10 depicts sphere 412 in four positions (positions 1 through 4), which represent an example number of measurements of the center of sphere 412 used to measure C-axis 158. In this example, the positions are spaced apart from one another by 30 degrees, between a start angle of 90 degrees (position 1) and an end angle of 0 degrees (position 4). It should be understood, however, that more or fewer measurements of sphere 412 at different angular positions may be made using the rotary axis measurement operation.

The first step in the rotary axis measurement operation as used in this example is to orient sphere 412 in position 1 by rotating platform 120. Next, controller 202 moves probe 304 by controlling the position of spindle 138 to begin measuring the position of sphere 412 using the sphere center measurement operation. More specifically, probe 304 is moved into contact with sphere 412 in the positive and negative directions along the X-axis 151 of the probe coordinate system, and a midpoint is computed in the manner described above. Probe 304 then measures the position of sphere 412 in the positive and negative directions along a path parallel to the Y-axis 153 of the probe coordinate system that intersects the computed midpoint, and controller 202 computes a midpoint of those measurements. Finally, probe 304 is used to measure the position of sphere 412 in the Z direction along a line parallel to the Z-axis 155 of the probe coordinate system that intersects the two previously computed midpoints. As explained above, with these five measurements, controller 202 computes the center of sphere 412 in position 1. As is also explained above, the sphere center measurement operation may be repeated to more accurately locate the center of sphere 412.

Next, platform 120 is rotated 30 degrees to move sphere 412 into position 2. The sphere center measurement operation is again employed in the manner described above to compute the center of sphere 412 in position 2. Sphere 412 is then rotated into positions 3 and 4, and its center is computed in those positions using the sphere center measurement operation.

Figure 11:
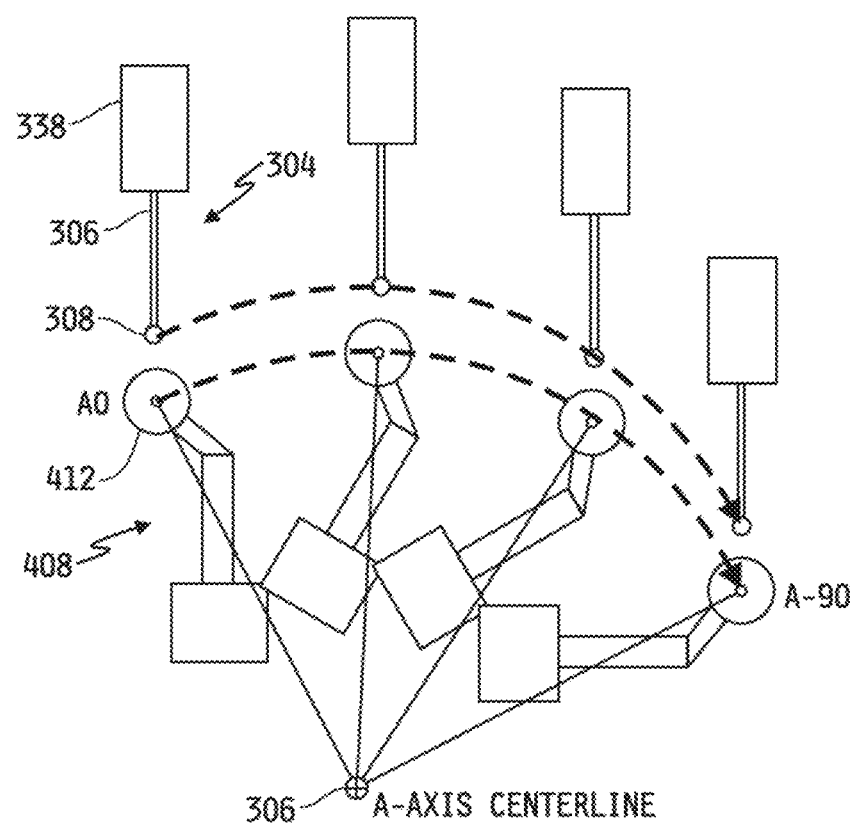
FIGS. 11 and 12 are conceptual diagrams depicting coordinated motion of a probe and a calibration sphere.

It should be understood that in one embodiment of the disclosure, probe 304 may be moved by controller 202 along with sphere 412 as sphere 412 is moved from one position to the next position as depicted in FIG. 11. More specifically, in FIG. 11, which depicts coordinated motion between rotary positions for axes that move a table (e.g., table 320 of FIG. 3), after the above-described five measurements are made of sphere 412 in a particular position (e.g., A0 of FIG. 11), controller 202 retracts probe 304 to the top of sphere 412, and then moves it along with sphere 412 as sphere 412 is rotated to the next position. The probe tip 308 remains at the same radial distance from the center of sphere 412 as the machine moves through the various rotary positions.

Figure 12:
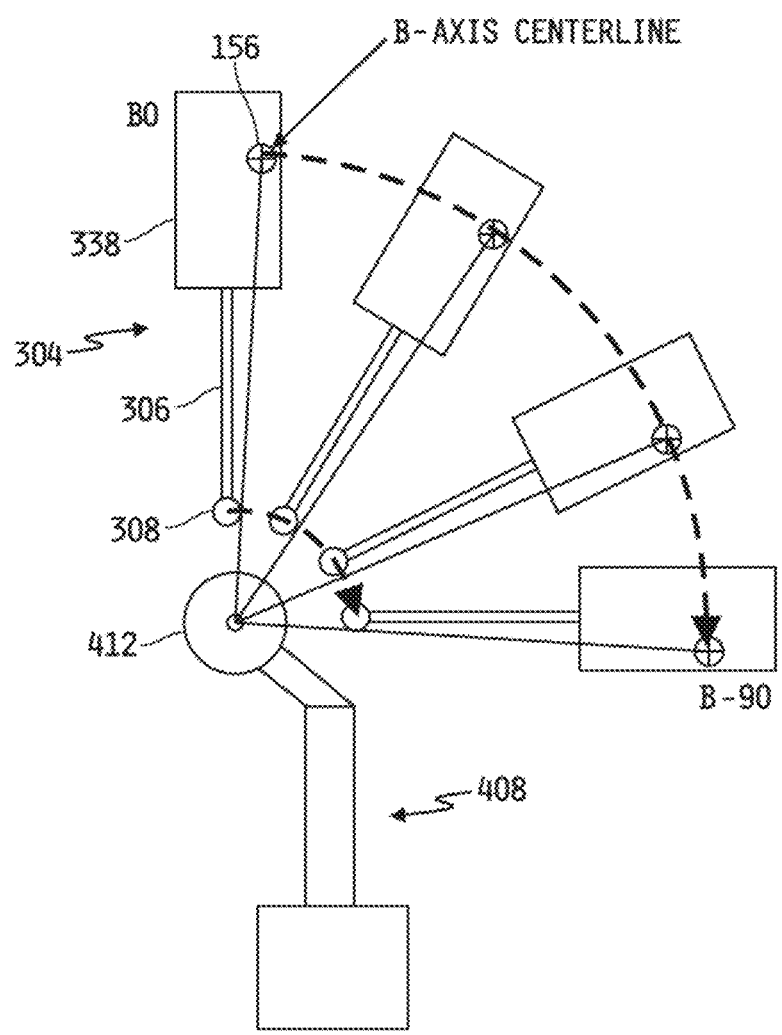

FIG. 12 similarly depicts motion between rotary positions for axis measurement of rotary axes that move spindle 338. As will be appreciated by those skilled in the art, the rotary axis measurement operations described herein may equally be employed to measure the orientation of axes that move probe 304 by maintaining sphere 412 in a stationary position and rotating probe 304 (e.g., about B axis 156 of FIG. 1) to various positions between a start angle and an end angle. During this operation, as shown in FIG. 12, tip 308 remains at the same radial distance from the center of sphere 412 as spindle 338 is rotated about B axis 156. By repositioning probe 304 simultaneously with sphere 412, rather than repositioning sphere 412 then probe 304, the rotary axis measurement operation may be performed more quickly.

The steps discussed above involved in moving sphere 412 and/or probe 304 into a new rotary position are employed in different ways depending upon the characteristics of the axis being measured. Unlike conventional techniques, the rotary axis measurement operation of the present disclosure may be used to measure the orientation of axes that are not fully articulating. Some machines have components that are adjustable about one or more axes, but the adjustments are not servo controlled. Instead, the component can only be moved to a relatively small, fixed number of positions about the axis (e.g., at one degree increments). The adjustments of the position of the component may be made manually, using a wrench or other tool, using a clutch and gear adjustment mechanism powered by the spindle, or using M codes provided to a controller configured to rotate and lock the axis. In any event, the rotary axis measurement operation can be used to measure the orientation of the adjustable axis relative to the linear axes of the machine in the manner described above.

Figure 18:
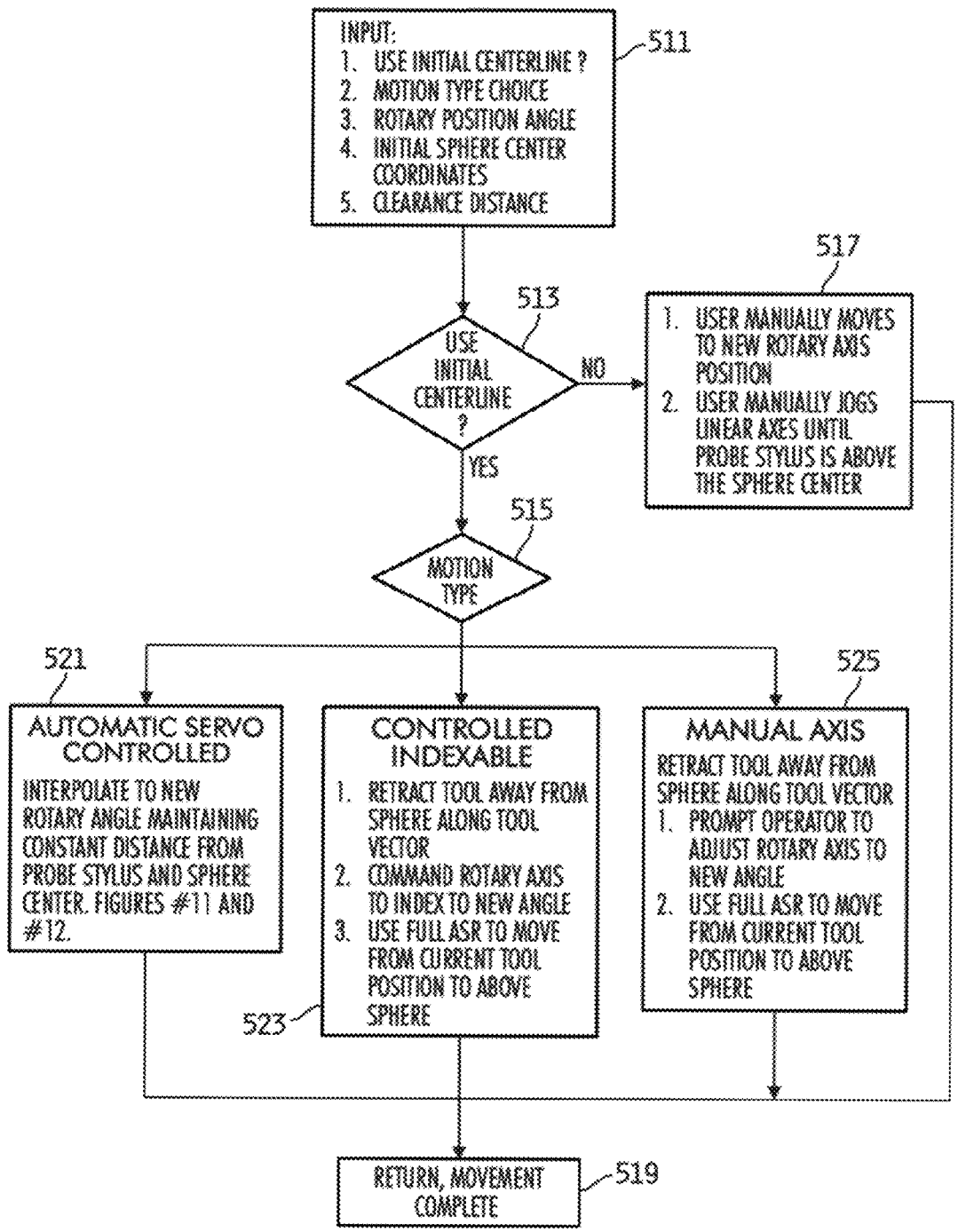
FIG. 18 is a block diagram of an operation for moving a sphere and/or probe to a new rotary position.

FIG. 18 depicts (in flowchart form) the manner in which controller 202 moves sphere 412 and/or probe 304. At block 511, controller 202 receives various inputs including an instruction of whether to use an initial centerline, a definition of the motion type to be employed (as is further described below), a rotary position angle, the initial center point coordinates for sphere 412, and a clearance distance. At block 513, controller 202 determines whether to move probe 304 using the inputted initial centerline. If the instruction was to use the initial centerline, then controller 202 uses the inputted motion type at block 515 to determine which motion operation to perform. If the initial centerline is not used, then (as indicated at block 517) controller 202 instructs the user to manually move sphere 412 to its new rotary position. The user then manually adjusts the position of probe 304 relative to the linear axes of the machine coordinate system until probe 304 is positioned approximately above the center of sphere 412. At that point, the movement to the new rotary angle is complete, as indicated by block 519.

When the initial centerline is used and the motion type is determined at at block 515, controller 202 executes one of blocks 521, 523, or 525. If the motion type corresponds to a fully articulating, servo controlled axis as represented by block 521, then controller 202 causes motion of sphere 412 and/or probe 304 in the manner described above with reference to FIGS. 11 and 12. During this motion, the clearance distance of block 511 is maintained between probe tip 308 and the center of sphere 412. If the axis is a controlled, indexable axis as indicated by block 523, then controller 202 retracts probe 304 from its current position away from sphere 412 along a tool vector, commands the rotary axis of the machine to index to a new angle, and employs the teachings of the Safe Repositioning Application to move probe 304 from its current position to a position above the center of sphere 412. Finally, if the axis is manually movable, then controller 202 retracts probe 304 from its current position away from sphere 412 along a tool vector, prompts the user to adjust the rotary axis to a new angle, and employs the teachings of the Safe Repositioning Application to move probe 304 from its current position to a position above the center of sphere 412. The move of sphere 412 and/or probe 304 is complete after the steps of one of blocks 521, 523 and 525 are performed as indicated by block 519.

Returning to FIG. 10, after completing the measurements of the center of sphere 412 in each of the four positions, controller 202 computes the orientation of C-axis 158. To do so, controller 202 computes a plane that statistically fits the center point measurements of sphere 412 using Principal Component Analysis. In this process, the least-squares orthogonal distances are minimized to a regression plane containing the centroid of the data. The eigenvector of the smallest eigenvalue is the normal of the best-fit plane to the data.

The least squares 3D plane contains the centroid of the data. The first step is to find the centroid of the center points measured for sphere 412:

$$\text{Centroid} = \frac{1}{n}\sum_{i=0}^{n} P_i \qquad \text{Equation 1}$$

Then, all of the points are transformed such that the centroid is the origin:

$$Pc_i = P_i - \text{Centroid} \qquad \text{Equation 2}$$

Next, a matrix M is created containing all the transformed data points and a matrix A which, when divide by n, is the covariance matrix:

$$M = \begin{bmatrix} Pc_{0,x} & Pc_{0,y} & Pc_{0,z} \\ Pc_{1,x} & Pc_{1,y} & Pc_{1,z} \\ & \vdots & \\ Pc_{n,x} & Pc_{n,y} & Pc_{n,z} \end{bmatrix} \qquad \text{Equation 3}$$

$$A = M^T M \qquad \text{Equation 4}$$

Using singular value decomposition:

$$M = USV^T \qquad \text{Equation 5}$$

where M is decomposed into an orthogonal matrix U, a diagonal matrix S containing singular values of M, and matrix V containing the singular vectors of M. Substitution of Equation 5 into Equation 4 yields the eigenvector decomposition of A where the eigenvectors of A are the eigenvectors of M:

$$A = VS^2 V^T \qquad \text{Equation 6}$$

The eigenvalues of A are the squares of the eigenvalues of M and the eigenvectors of A are the singular directions of M. The first two eigenvectors lie in the plane fitted to the data and the third eigenvector being the smallest singular vector of M is the normal to the plane. The normal to the plane is the statistical vector representing the axis of rotation.

With the orientation of the plane determined, controller 202 fits an arc in the plane to the X and Y coordinates of each of the center points (i.e., the center points computed at each of positions 1 through 4 that have been projected to the XY plane fitted to the positions). Controller 202 then computes the center of rotation of the arc, and a vector that passes through that center and is normal to the plane, which corresponds to the actual axis of rotation of platform 120 (i.e., the true orientation of C-axis 158). More specifically, an orthogonal coordinate system is generated containing the eigenvectors of the fitted plane and normal from the Principal Component Analysis with its center at the centroid of the data points. The data points are then transformed into the coordinate system and projected into the XY plane. A linear least-squares fit is used to compute the arc that best represents the data in the XY plane.

The least-squares fit is achieved by solving for the minimum error of the arc center relative to the centroid. The first step is to transform all the points that are relative to the centroid to the fitted orthogonal coordinate system using transform matrix T.

$$Ptc_i = TPc_i \quad \text{Equation 7}$$

The transformed points are then projected into the XY plane as follows:

$$\begin{Bmatrix} u_i \\ v_i \end{Bmatrix} = \begin{Bmatrix} Ptc_{i,x} \\ Ptc_{i,y} \end{Bmatrix} \quad \text{Equation 8}$$

The equation for arc points is as follows:

$$G(u,v) = (u-u_c)^2 + (v-v_c)^2 - R^2 \quad \text{Equation 9}$$

Let $$\alpha = R^2 \quad \text{Equation 10}$$

Formulation for least-squares fit:

$$E = \sum_{i=0}^{n} (G(u_i, v_i))^2 \quad \text{Equation 11}$$

$$\frac{\delta E}{\delta \alpha} = 2\sum_{i=0}^{n} (G(u_i, v_i)) \frac{\delta G(u_i, v_i)}{\delta \alpha} \quad \text{Equation 12}$$

Thus, $$\frac{\delta E}{\delta \alpha} = 0 \text{ only if } \sum_{i=0}^{n} (G(u_i, v_i)) = 0 \quad \text{Equation 13}$$

Also, $$\frac{\delta E}{\delta u_c} = 2\sum_{i=0}^{n} (G(u_i, v_i)) \frac{\delta G(u_i, v_i)}{\delta u_c} \quad \text{Equation 14}$$

$$\frac{\delta E}{\delta v_c} = 2\sum_{i=0}^{n} (G(u_i, v_i)) \frac{\delta G(u_i, v_i)}{\delta v_c} \quad \text{Equation 15}$$

For textual simplicity let $$S_u = \sum_{i=0}^{n} U_i, \; S_{uu} = \sum_{i=0}^{n} (U_i)^2, \; etc. \quad \text{Equation 16}$$

Then Equation 14 and Equation 15 can be expanded to the following equation set:

$$\begin{bmatrix} S_{uu} & S_{uv} \\ S_{uv} & S_{vv} \end{bmatrix} \begin{Bmatrix} u_c \\ v_c \end{Bmatrix} = \frac{1}{2} \begin{bmatrix} S_{uuu} + S_{uvv} \\ S_{vvv} + S_{vuu} \end{bmatrix} \quad \text{Equation 17}$$

from which the arc center can be computed by solving the system.

The arc radius can be computed by substituting the solution for $\begin{Bmatrix} u_c \\ v_c \end{Bmatrix}$ into Equation 13:

$$R = \sqrt{u_c^2 + v_c^2 + \frac{S_{uu} + S_{vv}}{n}} \quad \text{Equation 18}$$

The arc center is then transformed from the fitted plane coordinate system and the centroid to the original coordinate system:

$$C_c = T^{-1} \begin{bmatrix} u_c \\ v_c \\ 0 \end{bmatrix} \quad \text{Equation 19}$$

$$\text{Center} = C_c + \text{Centroid} \quad \text{Equation 20}$$

Figure 13:
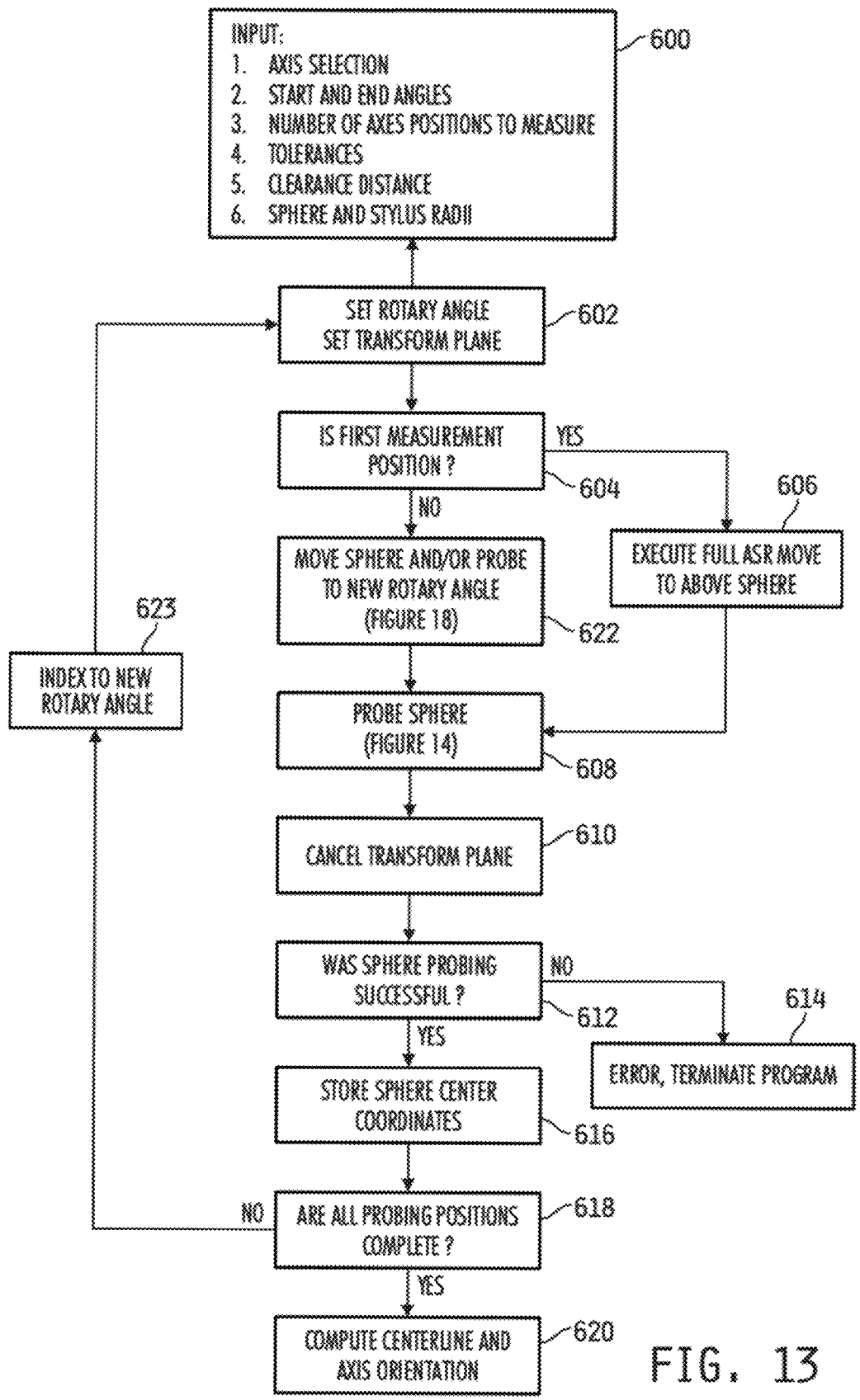
FIG. 13 is a block diagram of a rotary axis measurement operation according to an embodiment of the present disclosure.

FIG. 13 depicts the rotary axis measurement operation described above with reference to FIG. 10 in flowchart form. More specifically, at block 600 controller 202 reads a plurality of inputs including the axis selected for measurement, the start and end angles through which measurements of sphere 412 will be taken (i.e., angles 0 through 90 in the example described above with reference to FIG. 10), the tolerances to be used in determining whether the center point of sphere 412 is adequately measured, the clearance distance to be maintained between probe 304 and sphere 412 during coordinated movement of probe 304 and sphere 412 through the positions between the start and end angles, the actual radii of sphere 412 and probe tip 308, and the selected number of rotary positions to measure. Next, at block 602 controller 202 sets the rotary angle and the transform plane which is aligned to the probe coordinate system and located at the center of sphere 412 as depicted in FIG. 5. At block 604, controller 202 determines whether the current probing operation is the first of the series of probing operations used in the rotary axis measurement operation. If so, at block 606 controller 202 executes an automatic safe repositioning operation of probe 304 to a location above sphere 412 to within the clearance set at block 600 in the manner described in the Safe Repositioning Application referenced above. After probe 304 is safely repositioned, controller 202 executes the sphere center measurement operation described above as indicated by block 608 and depicted in FIGS. 7 and 9. The flowchart depicting the sphere center measurement operation is described below with reference to FIG. 14. Next, at block 610 controller 202 cancels the transform plane. At block 612, controller 202 determines whether the sphere center measurement operation of block 608 was successful. If not, controller 202 terminates operation and provides an error message as indicated by block 614. If the sphere center measurement operation was successful, then controller 202 stores the set of center point coordinates determined by that operation as indicated by block 616. At block 618, controller 202 determines whether sphere 412 has been probed in all of the positions between the start and end angles. If all probing operations are complete, then at block 620 controller 202 computes the centerline (i.e., location) and orientation of the axis being measured in the manner described above. If sphere 412 has not been probed at each position, then at block 623 controller 202 indexes sphere 412 and/or probe 304 to the next position or rotary angle using the angle increment data from block 600.

Next, at block 602 controller 202 again sets the rotary angle and the transform plane. At block 604, controller 202 determines that the current position is not the first measurement position and moves probe 304 and/or sphere 412 to the new rotary position as indicated by block 622 and discussed above with reference to FIG. 18. The steps indicated by blocks 608-618 are then repeated for the new position of sphere 412. As should be apparent from the foregoing, this process is repeated until sphere 412 is probed at all of the required positions between the start and end angles.

As should be apparent from the foregoing, when the rotary axis measurement operation is performed in a fully automated mode (i.e., probe 304 automatically moves with sphere 412 from measurement position to measurement position), the components of system 100 (i.e., platform 120, spindle 138, and saddles 104, 110, 126) may make rather significant position changes. In one embodiment of the present disclosure, a motion check mode is provided by controller 202 wherein probe 304 and sphere 412 are moved to the various positions, but probe 304 is not brought into contact with sphere 412, and is maintained outside a predefined clearance radius. By first operating in the motion check mode, an operator can ensure that the rotary axis measurement operation can be automatically performed without a risk of accidental contact between components of system 100.

FIG. 3 illustrates another example of employing the rotary axis measurement operation in the manner described above. In this example, the rotary axis measurement operation is used to compute the actual orientation of A-axis 302 relative to X-axis 152, Y-axis 150 and Z-axis 154 of system 300. As shown, platform 320 of system 300 is supported between two bearings 452, 454, which rotate platform 320 about A-axis 302. Platform 320 and/or spindle 338 are/is also movable along X-axis 152, which ideally is aligned with A-axis 302. Additionally, platform 320 and/or spindle 338 are/is movable along Y-axis 150 and Z-axis 154. In this example, calibration device 408 including sphere 412 is shown mounted to platform 320. Probe 304 is shown mounted in spindle 338, and optical receiver 310 is shown mounted adjacent spindle 338 to detect the position of probe 304.

Vector 456 represents the ideal A-axis 302, which is perfectly aligned with X-axis 152 of system 300. However, as a result of acceptable tolerances and slight errors and/or misalignments during assembly and set up of system 300, the actual orientation of A-axis 302 will not normally correspond perfectly to vector 456. Instead, as shown but greatly exaggerated, the true orientation of A-axis 302 is represented by vector 458.

Controller 202 computes vector 458 using the rotary axis measurement operation in the manner described above. More specifically, controller 202 employs the rotary axis measurement operation by rotating platform 320 to position sphere 412 into a variety of different angular positions about A-axis 302, and computes a center point of sphere 412 in each position using the sphere center measurement operation. After computing the sequence of center points for sphere 412, controller 202 fits a plane (depicted as plane 460) to the data, computes an arc lying in plane 460 that statistically fits the data, computes a center of rotation of the arc (point 462), and computes vector 458 which is normal to plane 460, passes through the center of rotation, and represents the true orientation of A-axis 302. If the misalignment of A-axis 302 is outside of specifications, technicians can adjust the assembly of system 300 and repeat the above-described procedure to ensure that platform 320 rotates about an axis that is within a specified tolerance of the ideal A-axis 302.

Referring again to FIG. 3, in some machine set ups, platform 320 actually shifts along its axis of rotation as it is rotated about that axis. For example, as platform 320 is rotated from 0 degrees to 90 degrees about A-axis 302, platform 320 may shift slightly along its axis of rotation. Such a shift is largely due to uneven loading on bearings 452, 454. During machine set up, precision plates, which are ground to specific thicknesses, are mounted under bearings 452, 454. If the thicknesses of the plates are slightly imperfect, stress is introduced into bearings 452, 454 such that rotation of platform 320 results in a linear shift along the axis of rotation.

The rotary axis measurement operation may be employed to measure the linear shift described above which, when present, causes the measured sphere locations to trace a helix instead of an arc. To do so, the process described above for computing the orientation of vector 458 is first performed with calibration device 408 mounted to platform 320 in the position shown. Next, calibration device 408 is moved to a position on platform 320 that is either closer to or farther from the axis of rotation (i.e., closer to or father from the center of platform 320), and the rotary axis measurement operation is repeated. In this manner, a plane is fitted to each set of sphere center data, one set corresponding to the original mounting location of sphere 412 and another set corresponding to the second mounting location. If the orientations of the planes are identical, then platform 320 does not shift with rotation about A-axis 320. The planes will not be identical, however, if platform 320 shifts. A constant shift for a given rotation will have a greater effect on the data resulting from the rotary axis measurement operation the closer calibration device 408 is mounted to the center of platform 320.

As will be apparent to those skilled in the art, in applications of the rotary axis measurement operation to measure for shift along a rotary axes that moves probe 304 (e.g., B axis 156 of FIG. 1) instead of sphere 412, the rotary axis measurement operation is first carried out with probe 304 in a first position in spindle 138 that places tip 308 a first distance from the rotary axis. Next, tip 308 is moved to a new distance from the rotary axis by mounting probe 304 such as by using a tool holder having a different length. The rotary axis measurement operation is then repeated, and the planes computed from the two operations are compared in the manner described above.

Below is a process to determine whether the data better fits a helix instead of an arc and to compute the helix axis vector, radius, and pitch. To determine whether axis shift is likely present (whether the data fits a helix better than an arc), the two fitted arc normals are compared to determine if they are significantly different. Next, a vector for the axis of the helix is computed. If the points are evenly spaced at a set incremental angle about the rotary axis, then the simple vector method can be used (See Kahn, P. C., Defining the axis of a helix. *Computers & Chemistry*, 13(3): 185-189, 1989). The cross product of a triad of bisectors is taken to compute the cylinder axis. The process can be repeated for each consecutive four data points and the helix axis vector can be computed as the average of the computed vectors. The quality of the computed helix axis can be represented by the dispersal of the computed helix vectors. However, if it is suspected that there is significant error in the sphere locations, perhaps due to poor positioning accuracy or low encoder resolution, then one of a variety of more advanced statistical methods can be implemented (See Christopher, J. A., Swanson, R., and Baldwin, T. O., Algorithms for finding the axis of a helix: Fast rotational and parametric least-squares methods. *Computers & Chemistry*, 20(3):339-345, 1996).

Next, the data points are projected onto the plane perpendicular to the computed vector of the helix using Equation 8. The radius and center coordinate of the projected points are computed by using the arc fitting methods described above. Finally, the pitch of the helix can be computed by performing a least-squares fit on the data with the shortest 3D distance to a point on the helix. Having solved for the radius and axis of the data, the least-squares fit will reduce to a function of one variable which can be solved with a root finder.

In another embodiment of the sphere center measurement operation described above, controller 202 uses measurements of the diameter or radius of sphere 412 to determine its center instead of or in addition to using the measurements (in the XYZ three dimensional volume of the system) from the five probing operations discussed above. More specifically, controller 202 performs the probing measurements in the positive and negative directions along X axis 151 of the probe coordinate system as shown in FIG. 7A to find the midpoint as described above, but also compares the known radius of sphere 412 to at least one radius from the center of sphere 412 (as indicated by the probing measurements) to a trigger position of a probing measurement ("a measured radius"). The measured radius is the radius of sphere 412 and the radius of stylus 306 plus the deflection offset for the probing measurement. If the measured radius is equal to the radius of sphere 412 within a specified tolerance, then controller 202 knows that probe 304 contacted sphere 412 at points that are perfectly normal to the sphere's surface. In other words, controller 202 knows, by comparing the measured radii to the known radius of sphere 412, that probe 304 has found the precise center of sphere 412 along X-axis 151.

Similarly, after probing sphere 412 along a path parallel to Y-axis 153 of the probe coordinate system that passes through the computed midpoint of the measurements made along X-axis 151, controller 202 determines the midpoint between the two measurements, computes at least one measured radius, and compares the at least one measured radius to the known radius of sphere 412. Again, if the at least one measured radius is equal to the known radius, controller 202 has located the center of sphere 412 along Y-axis 153. In an optional step, when probing along Z-axis 155, controller 202 may compare the distance between the contact point and the previously computed midpoints to the known radius of sphere 412 to determine whether probe 304 has contacted sphere 412 at a point that is perfectly normal to its surface. In the above-described manner, controller 202 can use the measurements from the sphere center measurement operation to not only compare the differences between center point measurements from sequential applications of the sphere center measurement operation to see if the measurements sufficiently converge to a tolerance, controller 202 can also determine whether the probing converges to precise measurements of the radius of sphere 412. Under some circumstances, one comparison may converge faster than the other. By making both comparisons, controller 202 can converge to a solution as quickly as possible. It should be understood that controller 202 may compute the measured radii after each probing operation as described above, or after the sphere center measurement operation has completed all of the probing operations, as described below with reference to FIG. 14.

Figure 14:
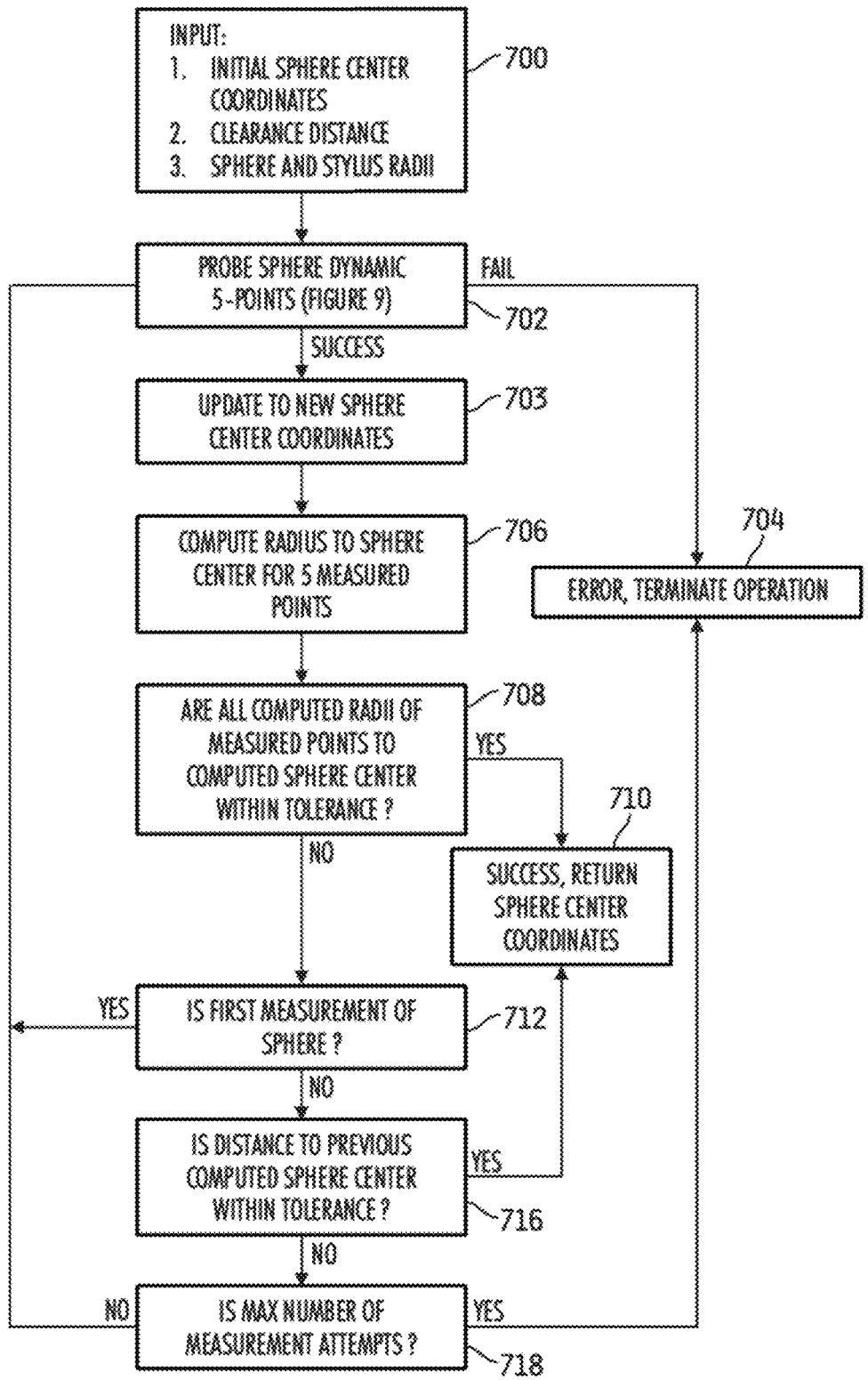
FIG. 14 is a block diagram of a sphere center determination operation according to an embodiment of the present disclosure.

FIG. 14 depicts a process for using a known radius of sphere 412 to determine the center of sphere 412 in the manner described above. More specifically, in block 700, controller 202 receives as inputs the initial X, Y and Z coordinates of sphere 412, the clearance distance probe 304 will use to position the tip 308 relative to sphere 412 to determine the probing start positions for each of the five points on sphere 412 to be probed, and the actual radii of sphere 412 and probe tip 308. At step 702, controller 202 executes the sphere center measurement operation described above with reference to FIG. 9. If that operation fails, then controller 202 terminates operation and returns an error message as indicated by block 704. If not, then controller 202 updates to use the new center coordinates of sphere 412 as indicated by block 703. Next, at block 706, controller 202 computes the measured radii of sphere 412 for each of the five measurements obtained during the sphere center measurement operation. At block 708, controller 202 determines whether all of the radii computed in block 706 are within the tolerance required. If the radii are within tolerance, then at block 710 controller 202 determines that the center point of sphere 412 is as calculated. If not, then controller 202 determines whether the current sphere center measurement operation is the first sphere center measurement operation as indicated by block 712. If it is, then controller 202 repeats the steps of blocks 702-712. If the current measurement is not the first measurement of sphere 412, then at block 716 controller 202 determines whether the distance between the previously computed radius to the center of sphere 412 is within the predetermined tolerance. If so, then controller 202 determines that the center point of sphere 412 is as calculated (block 710). If not, then controller 202 determines whether the maximum number of measurement attempts has been completed as indicated by block 718. If so, then controller 202 terminates operation and provides an error message as indicated by block 704. If not, then controller 202 repeats the steps of blocks 702-716.

As should be apparent from the foregoing, the rotary axis measurement operation of the present disclosure does not require an initial manual measurement of the centerline of the rotary axis being measured. In other systems, a test indicator or similar device must be used to determine with a fair amount of accuracy the centerline of the rotary axis. Only then can an automatic technique for more accurately determining the true centerline be employed. As described above, the rotary axis measurement operation of the present disclosure, on the other hand, permits an operator to manually jog probe 304 adjacent sphere 412 and measure its center without requiring any knowledge of the axis about which sphere 412 is being rotated. Once probe 304 is set up and calibrated, it may simply be manually jogged to a location near sphere 412, and commanded to perform the sphere center measurement operation. This process may be repeated with sphere 412 in at least two other positions about the rotary axis, and the centerline of the axis may be determined in the manner described above. Unlike systems that require an initial, manual measurement of the vector of the rotary axis, which is a time-consuming process, the methods of the present disclosure can be employed with no initial centerline data.

Finally, it should be understood that the concepts disclosed herein can be used to assess the volumetric accuracy of a 5-axis machine tool by measuring the sphere location errors at various rotary axes positions individually and in unison. The objective is to provide realistic positioning and repeatability assessment for 5-axis positioning. This additional information can be used to investigate the combined effects of accuracy and may be particularly useful in analyzing the effect of errors from independent axes on dependent axes which can be found on compound rotary tables and heads. For example, the effects on the dependent axis of alignment error, axis shift, or other problems with the independent axis can be measured and assessed. It also provides a method to characterize the positioning accuracy of a 5-axis machine and observe changes over time to determine when to service the machine.

The first step in the process is to measure the machine's linear axes (3-axis) accuracy and apply all necessary compensation to minimize the error contribution from the linear axes. After the centerlines have been measured the machine is ready for the 5-axis volumetric assessment process.

Figure 15:
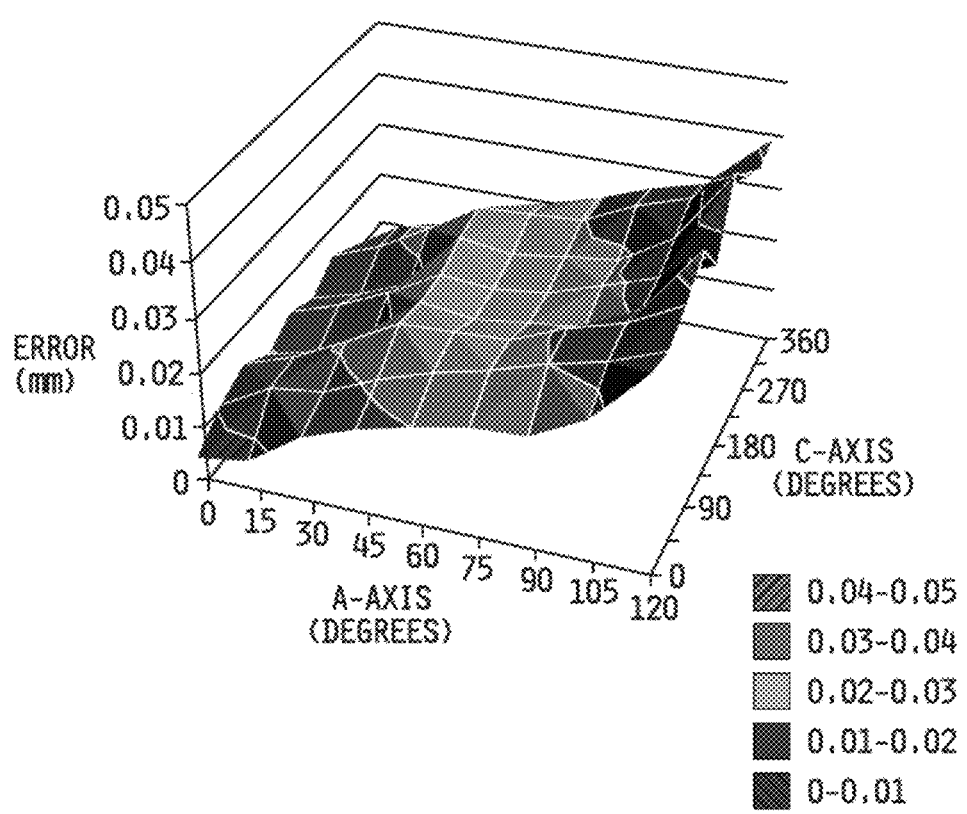
FIG. 15 is a three-dimensional plot of the error between commanded and actual positions of a calibration sphere at a plurality of rotary axes positions.

The volumetric measurement process involves executing measurements of sphere 412 through a grid of rotary axes positions as depicted in Table 1 below. The data is collected and the error between the control's commanded position and the actual measured center positions of sphere 412 is plotted as the error on the third axis as shown in FIG. 15. Of course the exact sequence and process including sphere location and probe stylus length would be determined by the machine tool builder to best represent individual machine work volumes.

TABLE 1

Measured errors in sphere center location (mm)

|  |  | C-Axis (degrees) | | | | | | | | |
|---|---|---|---|---|---|---|---|---|---|---|
|  |  | 0 | 45 | 90 | 135 | 180 | 225 | 270 | 315 | 360 |
| A-Axis (degrees) | 0 | 0.006 | 0.011 | 0.013 | 0.01 | 0.013 | 0.011 | 0.014 | 0.012 | 0.007 |
|  | 15 | 0.008 | 0.016 | 0.016 | 0.012 | 0.016 | 0.013 | 0.018 | 0.017 | 0.008 |
|  | 30 | 0.014 | 0.017 | 0.021 | 0.015 | 0.02 | 0.017 | 0.023 | 0.019 | 0.015 |
|  | 45 | 0.018 | 0.021 | 0.026 | 0.025 | 0.025 | 0.028 | 0.029 | 0.023 | 0.019 |
|  | 60 | 0.02 | 0.025 | 0.027 | 0.024 | 0.024 | 0.026 | 0.029 | 0.027 | 0.022 |
|  | 75 | 0.022 | 0.027 | 0.027 | 0.025 | 0.026 | 0.027 | 0.03 | 0.03 | 0.024 |
|  | 90 | 0.023 | 0.03 | 0.031 | 0.026 | 0.029 | 0.029 | 0.034 | 0.033 | 0.025 |
|  | 105 | 0.028 | 0.032 | 0.034 | 0.031 | 0.032 | 0.034 | 0.037 | 0.035 | 0.03 |
|  | 120 | 0.038 | 0.036 | 0.039 | 0.043 | 0.036 | 0.048 | 0.043 | 0.04 | 0.041 |

Since the error is computed as the distance between the commanded expected location of the center of sphere 412 and the actual measured location, the effects on error for changes to the centerline locations can be shown immediately without having to re-run the measurements. This is useful, for example, to show how much improvement was achieved when updating the centerlines.

The above-described methods can also help identify error trends to analyze machining accuracy issues. In the case of FIG. 15, the A-axis appears to increase the error the farther from the zero angle position it is moved. If the A-axis vector and linear axes are well aligned, then there could be a problem with the mechanical connection like the bearings due to the change in load direction by gravity.

Figure 16:
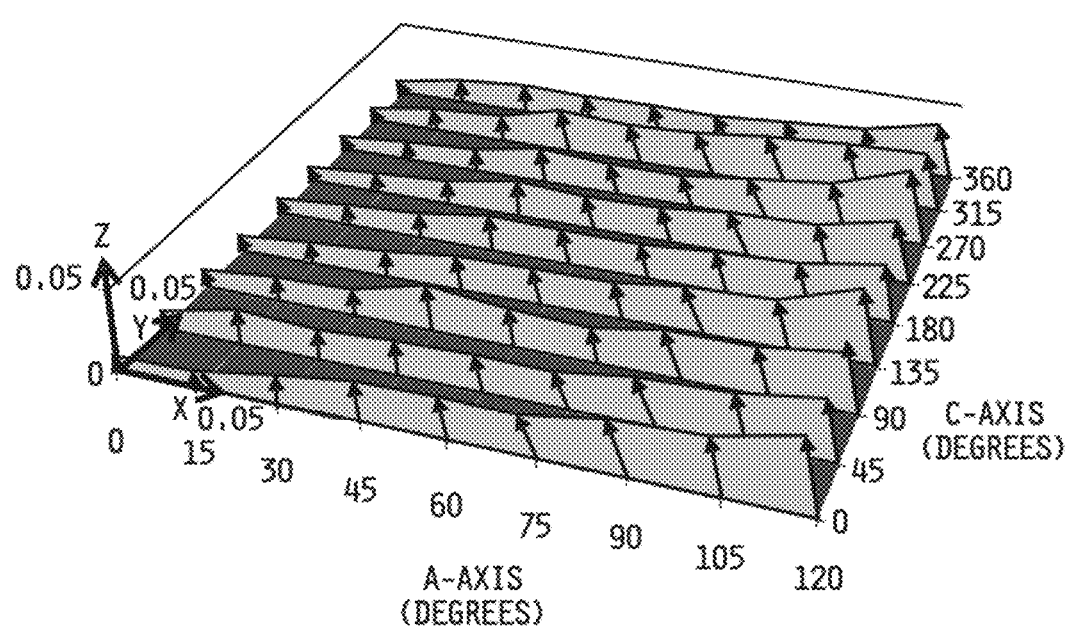
FIG. 16 is a three-dimensional plot of vectors showing the direction and magnitude of each error computation used to generate the plot of FIG. 15.

The vector components and their individual magnitudes for each error point can be plotted to further assist in analyzing the root cause of errors. Surfaces can be plotted showing the magnitude of the error for each coordinate direction (x,y,z) similar to the total error plot shown in FIG. 15. Alternatively, vectors showing the direction and magnitude for each position can be plotted in a single chart for each position as shown in FIG. 16. The individual vectors are scaled according to the X,Y,Z coordinate reference direction and scale shown in the figure. In the example of FIG. 16, the vector directions are relative to the machine coordinate system, however they can be plotted relative to any coordinate system including the probe coordinate system. The additional information of the vector direction of the error may assist in diagnosing problems with the machine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. On a machine tool system having a controller, three linear axes of motion establishing a machine coordinate system and at least one rotary axis, a method for determining the orientation of the rotary axis relative to the machine coordinate system, including:
   mounting a sphere to a component of the system;
   mounting a probe to a spindle of the system;
   rotating one of the sphere and the probe to at least three positions about the rotary axis;
   measuring a center of the sphere at each of the positions by using the controller to
   move the probe into contact with the sphere from a plurality of directions to generate a first plurality of points of contact, each point of contact having corresponding location data in the machine coordinate system determined in response to deflection of the probe upon contact with the sphere, wherein the deflection has an unknown direction,
   calculate a first center point of the sphere from the location data corresponding to the first plurality of points of contact between the probe and the sphere,
   use the location data corresponding to the first plurality of points of contact to move the probe into contact with the sphere from a plurality of directions to generate a second plurality of points of contact, the second plurality of points of contact being different from the first plurality of points of contact, and
   calculate a second center point of the sphere from the location data corresponding to the second plurality of points of contact between the probe and the sphere,
   comparing a difference between the calculated first center point and the calculated second center point to a predefined tolerance threshold;
   computing, using the controller, a plane that fits the center measurements;
   determining the orientation of the rotary axis of the machine tool system relative to the machine coordinate system by computing, using the controller, a vector normal to the plane that passes through a center of rotation of an arc that lies in the plane and fits the center measurements, the vector corresponding to the orientation of the rotary axis; and controlling operation of the machine tool system to form a part using the determined orientation of the rotary axis.

2. The method of claim 1, further including calibrating the probe to the sphere by manually locating the center of the sphere using a test indicator, and using the controller to move the probe toward the center of the sphere from a plurality of directions to determine deflection offsets of the probe resulting from contact with the sphere in each of the plurality of directions.

3. The method of claim 2, wherein the plurality of directions includes a positive X direction, a negative X direction, a positive Y direction, a negative Y direction and a Z direction of a coordinate system of the probe.

4. The method of claim 2, wherein the measuring step includes contacting the sphere with the probe from each of the plurality of directions, and for each contact with the sphere, measuring the location of the probe and applying a deflection offset corresponding to the direction of contact with the sphere.

5. The method of claim 1, wherein measuring further includes repeating the contacting, calculating and comparing until the difference is within the tolerance threshold.

6. The method of claim 5, wherein repeating the contacting, calculating and comparing is limited to a predetermined number of iterations.

7. The method of claim 1, wherein measuring includes moving the probe into contact with the sphere at five contact points corresponding to contact with the sphere in a positive and negative X direction, a positive and negative Y direction, and a Z direction of a coordinate system of the probe, and computing with the controller a center of the sphere using coordinates of the contact points.

8. The method of claim 1, wherein measuring includes using the controller to:
direct the probe toward the sphere in a positive direction along an X-axis of a coordinate system of the probe until the probe contacts the sphere at a first contact point,
direct the probe toward the sphere in a negative direction along the X-axis until the probe contacts the sphere at a second contact point,
compute a first midpoint between the first and second contact points,
direct the probe toward the sphere in a positive direction along a first path that is parallel to a Y-axis of the probe coordinate system and passes through the first midpoint until the probe contacts the sphere at a third contact point,
direct the probe toward the sphere in a negative direction along the first path until the probe contacts the sphere at a fourth contact point,
compute a second midpoint between the third and fourth contact points,
direct the probe toward the sphere along a second path that is parallel to a Z-axis of the probe coordinate system and passes through the second midpoint until the probe contacts the sphere at a fifth contact point, and
compute a first center point of the sphere relative to the machine coordinate system from location data corresponding to each of the contact points.

9. The method of claim 8, wherein measuring further includes using the controller to
direct the probe toward the sphere in a positive direction along a third path that is parallel to the X-axis and passes through the second midpoint until the probe contacts the sphere at a sixth contact point,
direct the probe toward the sphere in a negative direction along the third path until the probe contacts the sphere at a seventh contact point,
compute a third midpoint between the sixth and seventh contact points,
direct the probe toward the sphere in a positive direction along a fourth path that is parallel to the Y-axis and passes through the third midpoint until the probe contacts the sphere at an eighth contact point,
direct the probe toward the sphere in a negative direction along the fourth path until the probe contacts the sphere at a ninth contact point,
compute a fourth midpoint between the eighth and ninth contact points,
direct the probe toward the sphere along a fifth path that is parallel to the Z-axis and passes through the fourth midpoint until the probe contacts the sphere at a tenth contact point,
compute a second center point of the sphere relative to the machine coordinate system from location data corresponding to each of the fifth through tenth contact points,
compute a difference between the first center point to the second center point, and
compare the difference to a predefined tolerance.

10. The method of claim 8, wherein measuring further includes using the controller to
compute measured radii of the location data corresponding to each of the contact points relative to the first center point;
compare the measured radii to a known radius of the sphere; and
identify the first center point as a center of the sphere if the measured radii fall within a predetermined tolerance of the known radius.

11. The method of claim 1, wherein rotating includes automatically moving the probe along with the sphere as the sphere is moved to the at least three positions.

12. The method of claim 11, wherein the probe is rotated about the sphere center at a constant radius as the sphere is moved to the at least three positions.

13. The method of claim 1, wherein the rotary axis is not fully articulating and rotating is not performed by the controller.

14. On a machine tool system having a controller, three linear axes of motion establishing a machine coordinate system and a rotary axis, a method for determining a shift of the rotary axis, including:
mounting a sphere to a component of the system that is rotatable about the rotary axis at a first location at a first radial distance from the rotary axis;
rotating the component to move the sphere in the first location to a first set of at least three positions about the rotary axis;
measuring a first set of center points of the sphere, one center point for each of the first set of at least three positions, by using the controller to move a probe mounted to a spindle of the system into contact with the sphere;
computing, using the controller, a first plane that fits the first set of center points;
mounting the sphere to the component at a second location at a second radial distance from the rotary axis, the second radial distance being different from the first radial distance;

rotating the component to move the sphere in the second location to a second set of at least three positions about the rotary axis;

measuring a second set of center points of the sphere, one center point for each of the second set of at least three positions, by using the controller to move the probe into contact with the sphere;

computing, using the controller, a second plane that fits the second set of center points; and comparing, using the controller, the first and second planes to determine a shift of the rotary axis, wherein the shift is a linear shift along the rotary axis in a direction of the rotary axis.

15. On a machine tool system having a controller, three linear axes of motion establishing a machine coordinate system and a rotary axis, a method for determining a shift of the rotary axis, including:

mounting a probe to a first component of the system that is rotatable about the rotary axis at a first location such that a tip of the probe is at a first radial distance from the rotary axis;

mounting a sphere to a second component of the system;

rotating the first component to move the probe in the first location to a first set of at least three positions about the rotary axis;

measuring a first set of center points of the sphere, one center point for each of the first set of at least three positions, by using the controller to move the probe into contact with the sphere;

computing, using the controller, a first plane that fits the first set of center points;

mounting the probe to the first component at a second location such that the tip of the probe is at a second radial distance from the rotary axis, the second radial distance being different from the first radial distance;

rotating the first component to move the probe in the second location to a second set of at least three positions about the rotary axis;

measuring a second set of center points of the sphere, one center point for each of the second set of at least three positions, by using the controller to move the probe into contact with the sphere;

computing, using the controller, a second plane that fits the second set of center points; and comparing, using the controller, the first and second planes to determine a shift of the rotary axis, wherein the shift is a linear shift along the rotary axis in a direction of the rotary axis.

16. A method for measuring a rotary axis of a machine tool system relative to linear axes including an X-axis, a Y-axis and a Z-axis of the system, including: mounting a sphere to a component of the system that is movable about the rotary axis;

positioning the sphere in a first position at a first angle relative to the rotary axis;

mounting a probe to a spindle of the system;

determining a first center point of the sphere in the first position by using a controller of the system to perform a sphere center measurement operation, including directing the probe toward the sphere in a positive direction along an X-axis of a coordinate system of the probe until the probe contacts the sphere at a first contact point, directing the probe toward the sphere in a negative direction along the X-axis until the probe contacts the sphere at a second contact point, computing a first midpoint between the first and second contact points directing the probe toward the sphere in a positive direction along a path parallel to a Y-axis of the coordinate system of the probe that passes through the first midpoint until the probe contacts the sphere at a third contact point, directing the probe toward the sphere in a negative direction along the path parallel to the Y-axis until the probe contacts the sphere at a fourth contact point, computing a second midpoint between the third and fourth contact points, directing the probe toward the sphere along a path parallel to a Z-axis of the coordinate system of the probe that passes through the second midpoint until the probe contacts the sphere at a fifth contact point, and computing the first center point of the sphere within a three dimensional volume of the system using the first, second, third, fourth and fifth contact points, the center point having an X coordinate, a Y coordinate, and a Z coordinate in a machine coordinate system and each of the contact points are determined in response to deflection of the probe upon contact with the sphere, wherein the deflection has an unknown direction;

positioning the sphere in a second position at a second angle relative to the rotary axis;

determining a second center point of the sphere in the second position by using the controller to perform the sphere center measurement operation;

positioning the sphere in a third position at a third angle relative to the rotary axis;

determining a third center point of the sphere in the third position by using the controller to perform the sphere center measurement operation;

computing a plane that fits the first, second and third center points;

computing an arc that lies in the plane and fits the X and Y coordinates of the first, second and third center points;

computing a center of rotation of the arc; and identifying the orientation of the rotary axis as a vector which is normal to the plane and passes through the center of rotation of the arc.

17. The method of claim 16, further including calibrating the probe to the sphere by manually locating the center of the sphere using a test indicator, and using the controller to move the probe toward the center of the sphere from a plurality of directions to determine deflection offsets of the probe resulting from contact with the sphere in each of the plurality of directions.

18. The method of claim 16, wherein the sphere center measurement operation further includes:

directing the probe toward the sphere in a positive direction along a third path that is parallel to the X-axis and passes through the second midpoint until the probe contacts the sphere at a sixth contact point, directing the probe toward the sphere in a negative direction along the third path until the probe contacts the sphere at a seventh contact point, computing a third midpoint between the sixth and seventh contact points, directing the probe toward the sphere in a positive direction along a fourth path that is parallel to the Y-axis of the probe coordinate system and passes through the third midpoint until the probe contacts the sphere at an eighth contact point, directing the probe toward the sphere in a negative direction along the fourth path until the probe contacts the sphere at a ninth contact point, computing a fourth midpoint between the eighth and ninth contact points, directing the probe toward the sphere along a fifth path that is parallel to the Z-axis of the probe coordinate system and passes through the fourth midpoint until the probe contacts the sphere at a tenth contact point, computing a second center point of the sphere relative to the linear axes from location data corresponding to each of the fifth through tenth contact points, computing a difference between the first center point to the second center point, and comparing the difference to a predefined tolerance.

19. The method of claim 16, wherein the sphere center measurement operation further includes computing measured radii of the sphere using the first, second, third, fourth and fifth contact points;

comparing the measured radii to a known radius of the sphere; and identifying the first center point as the center of the sphere if the measured radii fall within a predetermined tolerance of the known radius.

20. The method of claim 16, wherein the rotary axis is not fully articulating and the positioning steps are not performed by the controller.

21. A method for measuring a rotary axis of a machine tool system relative to X, Y and Z axes of the system using a probe mounted to a spindle of the system, including:

mounting a sphere to a component of the system;

positioning the probe in a first position about the rotary axis;

determining a first center point of the sphere by using a controller of the system to perform a sphere center measurement operation, including moving the probe in a positive direction along an X-axis of a coordinate system of the probe into contact with the sphere at a first contact point, moving the probe in a negative direction along the X-axis of the probe coordinate system into contact with the sphere at a second contact point, moving the probe in a positive direction along a first path parallel to a Y-axis of the coordinate system of the probe into contact with the sphere at a third contact point, the first path passing through a first midpoint between the first and second contact points, moving the probe in a negative direction along the first path into contact with the sphere at a fourth contact point, moving the probe along a second path parallel to a Z-axis of the coordinate system of the probe into contact with the sphere at a fifth contact point, the second path passing through the first midpoint and a midpoint between the third and fourth contact points, and computing the first center point of the sphere using X, Y and Z coordinates corresponding to each of the contact points, the center point having X, Y and Z coordinates in a machine coordinate system and each of the contact points are determined in response to deflection of the probe upon contact with the sphere, wherein the deflection has an unknown direction;

positioning the probe in a second position about the rotary axis;

determining a second center point of the sphere by using the controller to perform the sphere center measurement operation;

positioning the probe in a third position about the rotary axis;

determining a third center point of the sphere by using the controller to perform the sphere center measurement operation;

computing a plane that fits the center points;

computing an arc that lies in the plane and fits the X and Y coordinates of the center points;

computing a center of rotation of the arc; and identifying the orientation of the rotary axis as a vector which is normal to the plane and passes through the center of rotation of the arc.

22. A method for measuring a rotary axis of a machine tool system relative to X, Y and Z axes establishing a machine coordinate system using a probe mounted to a spindle of the system, including:

positioning a sphere in a first position about the rotary axis;

determining a center point of the sphere in the first position by using a controller of the system to perform a sphere center measurement operation including moving the probe into contact with the sphere at five contact points corresponding to contact in a positive and a negative X direction, a positive and a negative Y direction, and a Z direction of a coordinate system of the probe, and computing a center of the sphere using coordinates of the contact points, each of the contact points being determined in response to deflection of the probe upon contact with the sphere, wherein the deflection has an unknown direction;

rotating the sphere about the rotary axis into a second position;

determining a center point of the sphere in the second position by using the controller to perform the sphere center measurement operation; rotating the sphere about the rotary axis into a third position;

determining a center point of the sphere in the third position by using the controller to perform the sphere center measurement operation;

calculating a centroid using the center points;

transforming the center points such that the centroid is an origin of the center points;

computing a plane that fits the transformed center points;

projecting the transformed center points onto the plane;

computing an arc that fits the projected center points;

determining a center point of the arc; and identifying the orientation of the rotary axis as a vector which is normal to the plane and fits the transformed center points.

* * * * *